(12) United States Patent
Knab et al.

(10) Patent No.: US 11,475,484 B1
(45) Date of Patent: *Oct. 18, 2022

(54) SYSTEM AND METHOD OF PERSONALIZING ONLINE MARKETING CAMPAIGNS

(71) Applicant: Overstock.com, Inc., Midvale, UT (US)

(72) Inventors: J P Knab, Salt Lake City, UT (US); Bradford Johnson, Salt Lake City, UT (US); Cathy Diaz, Salt Lake City, UT (US); Dustin Spangler, Salt Lake City, UT (US); Kenneth Lines, Salt Lake City, UT (US)

(73) Assignee: Overstock.com, Inc., Midvale, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/181,728

(22) Filed: Feb. 22, 2021

Related U.S. Application Data

(63) Continuation of application No. 13/968,248, filed on Aug. 15, 2013, now Pat. No. 10,929,890.

(51) Int. Cl.
*G06Q 30/02* (2012.01)
*G06F 16/9535* (2019.01)

(52) U.S. Cl.
CPC ..... *G06Q 30/0269* (2013.01); *G06F 16/9535* (2019.01)

(58) Field of Classification Search
CPC .......... G06Q 30/0269; G06F 16/9535
See application file for complete search history.

(56) References Cited

U.S. PATENT DOCUMENTS 3,573,747 A  4/1971 Adams et al.
3,581,072 A  5/1971 Nymeyer
(Continued)

FOREIGN PATENT DOCUMENTS

CA  2253543  3/1997
CA  2347812  5/2000
(Continued)

OTHER PUBLICATIONS

Gallagher et al. A framework for targeting banner advertising on the internet. IEEE, pp. 265-274. (Year: 1997).*

(Continued)

*Primary Examiner* — Michael W Schmucker
*Assistant Examiner* — Christopher C Busch
(74) *Attorney, Agent, or Firm* — Clayton Howarth, P.C.

(57) ABSTRACT

Personalized electronic content is generated for display on a user computer. The content is generated by first matching a targeted user online identifier to one of a plurality of user online identifiers associated with a master ID in a database. Using online user behavior associated with the user online identifiers of the master ID, a preliminary set of personalized electronic content is generated. A set of content usage parameters is applied to the preliminary set of personalized electronic content to define the personalized electronic content, which is then transmitted and displayed on a user computer. The personalized electronic content may comprise targeted advertisement utilized to populate a webpage or an email template defined by an online marketing campaign.

18 Claims, 6 Drawing Sheets

(56) References Cited

U.S. PATENT DOCUMENTS

| | | |
|---|---|---|
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,808,987 A | 2/1989 | Takeda et al. |
| 4,823,265 A | 4/1989 | Nelson |
| 4,854,516 A | 8/1989 | Yamada |
| 4,903,201 A | 2/1990 | Wagner |
| RE33,316 E | 8/1990 | Katsuta et al. |
| 5,027,110 A | 6/1991 | Chang et al. |
| 5,053,956 A | 10/1991 | Donald et al. |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,301,350 A | 4/1994 | Rogan et al. |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,377,354 A | 12/1994 | Scannell et al. |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,621,790 A | 4/1997 | Grossman et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,907,547 A | 5/1999 | Foldare et al. |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A | 9/1999 | DeLorme et al. |
| 5,948,061 A | 9/1999 | Merriman et al. |
| 5,970,490 A | 10/1999 | Morgenstern |
| 5,974,396 A | 10/1999 | Anderson et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,049,797 A | 4/2000 | Guha et al. |
| 6,055,518 A | 4/2000 | Franklin et al. |
| 6,058,379 A | 5/2000 | Odom et al. |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Copple et al. |
| 6,185,558 B1 | 2/2001 | Bowman et al. |
| 6,192,407 B1 | 2/2001 | Smith et al. |
| 6,199,077 B1 | 3/2001 | Inala et al. |
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,905 B1 | 3/2002 | Gershman et al. |
| 6,356,908 B1 | 3/2002 | Brown et al. |
| 6,366,899 B1 | 4/2002 | Kernz |
| 6,370,527 B1 | 4/2002 | Singhal |
| 6,373,933 B1 | 4/2002 | Sarkki et al. |
| 6,374,260 B1 | 4/2002 | Hoffert et al. |
| 6,381,510 B1 | 4/2002 | Amidhozour et al. |
| 6,415,270 B1 | 7/2002 | Rackson et al. |
| 6,415,320 B1 | 7/2002 | Hess et al. |
| 6,434,556 B1 | 8/2002 | Levin et al. |
| 6,456,307 B1 | 9/2002 | Bates et al. |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,522,955 B1 | 2/2003 | Colborn |
| 6,523,037 B1 | 2/2003 | Monahan et al. |
| 6,601,061 B1 | 7/2003 | Holt et al. |
| 6,604,107 B1 | 8/2003 | Wang |
| 6,625,764 B1 | 9/2003 | Dawson |

(56) References Cited

U.S. PATENT DOCUMENTS

| | | |
|---|---|---|
| 6,643,696 B2 | 11/2003 | Davis et al. |
| 6,661,431 B1 | 12/2003 | Stuart et al. |
| 6,665,838 B1 | 12/2003 | Brown et al. |
| 6,675,178 B1 | 1/2004 | Chinchar et al. |
| 6,694,436 B1 | 2/2004 | Audebert |
| 6,701,310 B1 | 3/2004 | Sugiura et al. |
| 6,718,536 B2 | 4/2004 | Dupaquis |
| 6,725,268 B1 | 4/2004 | Jacket et al. |
| 6,728,704 B2 | 4/2004 | Mao et al. |
| 6,732,161 B1 | 5/2004 | Hess et al. |
| 6,732,162 B1 | 5/2004 | Wood et al. |
| 6,801,909 B2 | 10/2004 | Delgado et al. |
| 6,856,963 B1 | 2/2005 | Hurwitz |
| 6,889,054 B2 | 5/2005 | Himmel et al. |
| 6,907,401 B1 | 6/2005 | Vittal et al. |
| 6,912,505 B2 | 6/2005 | Linden et al. |
| 6,978,273 B1 | 12/2005 | Bonneau et al. |
| 7,043,450 B2 | 5/2006 | Velez et al. |
| 7,069,242 B1 | 6/2006 | Sheth et al. |
| 7,076,453 B2 | 7/2006 | Jammes et al. |
| 7,076,504 B1 | 7/2006 | Handel et al. |
| 7,080,030 B2 | 7/2006 | Eglen et al. |
| 7,099,891 B2 | 8/2006 | Harris et al. |
| 7,100,111 B2 | 8/2006 | McElfresh et al. |
| 7,100,195 B1 | 8/2006 | Underwood |
| 7,117,207 B1 | 10/2006 | Kerschberg et al. |
| 7,127,416 B1 | 10/2006 | Tenorio |
| 7,165,091 B2 | 1/2007 | Lunenfeld |
| 7,167,910 B2 | 1/2007 | Farnham et al. |
| 7,216,115 B1 | 5/2007 | Walters et al. |
| 7,240,016 B1 | 7/2007 | Sturgis et al. |
| 7,254,547 B1 | 8/2007 | Beck et al. |
| 7,305,614 B2 | 12/2007 | Chen et al. |
| 7,318,037 B2 | 1/2008 | Solari |
| 7,324,966 B2 | 1/2008 | Scheer |
| 7,340,249 B2 | 3/2008 | Moran et al. |
| 7,349,668 B2 | 3/2008 | Ilan et al. |
| 7,353,188 B2 | 4/2008 | Yim et al. |
| 7,366,755 B1 | 4/2008 | Cuomo et al. |
| 7,379,890 B2 | 5/2008 | Myr et al. |
| 7,380,217 B2 | 5/2008 | Gvelesiani |
| 7,383,320 B1 | 6/2008 | Silberstein et al. |
| 7,401,025 B1 | 7/2008 | Lokitz |
| 7,447,646 B1 | 11/2008 | Agarwal et al. |
| 7,451,476 B1 | 11/2008 | Banks et al. |
| 7,454,464 B2 | 11/2008 | Puthenkulam et al. |
| 7,457,730 B2 | 11/2008 | Degnan |
| 7,493,521 B1 | 2/2009 | Li et al. |
| 7,496,525 B1 | 2/2009 | Mitchell |
| 7,496,527 B2 | 2/2009 | Silverstein et al. |
| 7,496,582 B2 | 2/2009 | Farnham et al. |
| 7,516,094 B2 | 4/2009 | Perkowski |
| 7,539,696 B1 | 5/2009 | Greener et al. |
| 7,546,625 B1 | 6/2009 | Kamangar |
| 7,552,067 B2 | 6/2009 | Nephew et al. |
| 7,565,615 B2 | 7/2009 | Ebert |
| 7,606,743 B2 | 10/2009 | Orzell et al. |
| 7,610,212 B2 | 10/2009 | Klett et al. |
| 7,653,573 B2 | 1/2010 | Hayes, Jr. et al. |
| 7,834,883 B2 | 11/2010 | Adams |
| 7,904,348 B2 | 3/2011 | Johnson et al. |
| 7,912,748 B1 | 3/2011 | Rosenberg et al. |
| 7,921,031 B2 | 4/2011 | Crysel et al. |
| 7,941,751 B2 | 5/2011 | Ebert |
| 7,979,340 B2 | 7/2011 | MacDonald Korth et al. |
| 7,983,950 B2 | 7/2011 | De Vita |
| 7,983,963 B2 | 7/2011 | Byrne et al. |
| 8,086,643 B1 | 12/2011 | Tenorio |
| 8,112,303 B2 | 2/2012 | Eglen et al. |
| 8,140,989 B2 | 3/2012 | Cohen et al. |
| 8,166,155 B1 | 4/2012 | Rachmeler et al. |
| 8,204,799 B1 | 6/2012 | Murray et al. |
| 8,214,264 B2 | 7/2012 | Kasavin et al. |
| 8,214,804 B2 | 7/2012 | Robertson |
| 8,260,852 B1 | 9/2012 | Cselle |
| 8,312,056 B1 | 11/2012 | Peng et al. |
| 8,326,662 B1 | 12/2012 | Byrne et al. |
| 8,370,269 B2 | 2/2013 | MacDonald-Korth et al. |
| 8,370,435 B1 | 2/2013 | Bonefas et al. |
| 8,392,356 B2 | 3/2013 | Stoner et al. |
| 8,452,691 B2 | 5/2013 | MacDonald Korth et al. |
| 8,473,316 B1 | 6/2013 | Panzitta et al. |
| 8,494,912 B2 | 7/2013 | Fraser et al. |
| 8,545,265 B2 | 10/2013 | Sakamoto et al. |
| 8,577,740 B1 | 11/2013 | Murray et al. |
| 8,583,480 B2 | 11/2013 | Byrne |
| 8,630,960 B2 | 1/2014 | Gross |
| 8,676,632 B1 | 3/2014 | Watson et al. |
| 8,693,494 B2 | 4/2014 | Fiatal |
| 8,719,075 B2 | 5/2014 | MacDonald Korth et al. |
| 8,793,650 B2 | 7/2014 | Hilerio et al. |
| 9,047,341 B2 | 6/2015 | Pan |
| 9,047,642 B2 | 6/2015 | Byrne et al. |
| 9,448,692 B1 | 9/2016 | Mierau et al. |
| 9,483,788 B2 | 11/2016 | Martin |
| 9,741,080 B1 | 8/2017 | Byrne |
| 9,747,622 B1 | 8/2017 | Johnson et al. |
| 9,805,425 B2 | 10/2017 | MacDonald-Korth et al. |
| 9,928,752 B2 | 3/2018 | Byrne et al. |
| 9,940,659 B1 | 4/2018 | Behbahani et al. |
| 10,074,118 B1 | 9/2018 | Johnson et al. |
| 10,102,287 B2 | 10/2018 | Martin |
| 10,269,081 B1 | 4/2019 | Byrne |
| 10,423,997 B2 | 9/2019 | MacDonald-Korth et al. |
| 10,534,845 B2 | 1/2020 | Noursalehi et al. |
| 10,769,219 B1 | 9/2020 | Martin |
| 10,810,654 B1 | 10/2020 | Robertson et al. |
| 10,853,891 B2 | 12/2020 | MacDonald-Korth et al. |
| 10,872,350 B1 | 12/2020 | Hu et al. |
| 10,896,451 B1 | 1/2021 | Johnson et al. |
| 10,929,890 B2 | 2/2021 | Knab et al. |
| 10,949,876 B2 | 3/2021 | Johnson et al. |
| 10,970,463 B2 | 4/2021 | Noursalehi et al. |
| 10,970,769 B2 | 4/2021 | Iqbal |
| 2001/0014868 A1 | 8/2001 | Herz et al. |
| 2001/0034667 A1 | 10/2001 | Petersen |
| 2001/0034668 A1 | 10/2001 | Whitworth |
| 2001/0044751 A1 | 11/2001 | Pugliese, III et al. |
| 2001/0047290 A1 | 11/2001 | Petras et al. |
| 2001/0047308 A1 | 11/2001 | Kaminsky et al. |
| 2001/0051996 A1 | 12/2001 | Cooper et al. |
| 2002/0002513 A1 | 1/2002 | Chiasson |
| 2002/0007356 A1 | 1/2002 | Rice et al. |
| 2002/0013721 A1 | 1/2002 | Dabbiere et al. |
| 2002/0019763 A1 | 2/2002 | Linden et al. |
| 2002/0022995 A1 | 2/2002 | Miller et al. |
| 2002/0023059 A1 | 2/2002 | Bari et al. |
| 2002/0026390 A1 | 2/2002 | Ulenas et al. |
| 2002/0029187 A1 | 3/2002 | Meehan et al. |
| 2002/0038312 A1 | 3/2002 | Donner et al. |
| 2002/0040352 A1 | 4/2002 | McCormick |
| 2002/0042738 A1 | 4/2002 | Srinivasan et al. |
| 2002/0049622 A1 | 4/2002 | Lettich et al. |
| 2002/0056044 A1 | 5/2002 | Andersson |
| 2002/0099578 A1 | 7/2002 | Eicher, Jr. et al. |
| 2002/0099579 A1 | 7/2002 | Stowell et al. |
| 2002/0099602 A1 | 7/2002 | Moskowitz et al. |
| 2002/0107718 A1 | 8/2002 | Morrill et al. |
| 2002/0107853 A1 | 8/2002 | Hofmann et al. |
| 2002/0111826 A1 | 8/2002 | Potter et al. |
| 2002/0120537 A1 | 8/2002 | Morea et al. |
| 2002/0120609 A1 | 8/2002 | Lang et al. |
| 2002/0123957 A1 | 9/2002 | Notarius et al. |
| 2002/0124100 A1 | 9/2002 | Adams |
| 2002/0129282 A1 | 9/2002 | Hopkins |
| 2002/0133502 A1 | 9/2002 | Rosenthal et al. |
| 2002/0138399 A1 | 9/2002 | Hayes et al. |
| 2002/0147625 A1 | 10/2002 | Kolke, Jr. |
| 2002/0156802 A1 | 10/2002 | Takayama et al. |
| 2002/0161648 A1 | 10/2002 | Mason et al. |
| 2002/0161664 A1 | 10/2002 | Shaya et al. |
| 2002/0188777 A1 | 12/2002 | Kraft et al. |
| 2002/0194049 A1 | 12/2002 | Boyd |
| 2002/0198784 A1 | 12/2002 | Shaak et al. |

(56) References Cited

U.S. PATENT DOCUMENTS

| | | |
|---|---|---|
| 2002/0198882 A1 | 12/2002 | Linden et al. |
| 2003/0004855 A1 | 1/2003 | Dutta et al. |
| 2003/0005046 A1 | 1/2003 | Kavanagh et al. |
| 2003/0009362 A1 | 1/2003 | Cifani et al. |
| 2003/0009392 A1 | 1/2003 | Perkowski |
| 2003/0014400 A1 | 1/2003 | Siegel |
| 2003/0028451 A1 | 2/2003 | Ananian |
| 2003/0028605 A1 | 2/2003 | Millett et al. |
| 2003/0032409 A1 | 2/2003 | Hutcheson et al. |
| 2003/0035138 A1 | 2/2003 | Schilling |
| 2003/0036914 A1 | 2/2003 | Fitzpatrick et al. |
| 2003/0040970 A1 | 2/2003 | Miller |
| 2003/0041008 A1 | 2/2003 | Grey et al. |
| 2003/0046149 A1 | 3/2003 | Wong |
| 2003/0069740 A1 | 4/2003 | Zeidman |
| 2003/0069790 A1 | 4/2003 | Kane |
| 2003/0069825 A1 | 4/2003 | Hoffman et al. |
| 2003/0083961 A1 | 5/2003 | Bezos et al. |
| 2003/0088467 A1 | 5/2003 | Culver |
| 2003/0088511 A1 | 5/2003 | Korboulonis et al. |
| 2003/0093331 A1 | 5/2003 | Childs et al. |
| 2003/0097352 A1 | 5/2003 | Gulla et al. |
| 2003/0105682 A1 | 6/2003 | Dicker et al. |
| 2003/0110100 A1 | 6/2003 | Wirth, Jr. |
| 2003/0119492 A1 | 6/2003 | Timmins et al. |
| 2003/0131095 A1 | 7/2003 | Kumhyr et al. |
| 2003/0139969 A1 | 7/2003 | Scroggie et al. |
| 2003/0140007 A1 | 7/2003 | Kramer et al. |
| 2003/0140121 A1 | 7/2003 | Adams |
| 2003/0158792 A1 | 8/2003 | Perkowski |
| 2003/0163340 A1 | 8/2003 | Fitzpatrick et al. |
| 2003/0167213 A1 | 9/2003 | Jammes et al. |
| 2003/0167222 A1 | 9/2003 | Mehrotra et al. |
| 2003/0177103 A1 | 9/2003 | Ivanov et al. |
| 2003/0187745 A1 | 10/2003 | Hobday et al. |
| 2003/0200156 A1 | 10/2003 | Roseman et al. |
| 2003/0204449 A1 | 10/2003 | Kotas et al. |
| 2003/0217002 A1 | 11/2003 | Enborg |
| 2003/0220835 A1 | 11/2003 | Barnes, Jr. |
| 2004/0006509 A1 | 1/2004 | Mannik et al. |
| 2004/0015416 A1 | 1/2004 | Foster et al. |
| 2004/0029567 A1 | 2/2004 | Timmins et al. |
| 2004/0041836 A1 | 3/2004 | Zaner et al. |
| 2004/0044563 A1 | 3/2004 | Stein |
| 2004/0055017 A1 | 3/2004 | Delpuch et al. |
| 2004/0058710 A1 | 3/2004 | Timmins et al. |
| 2004/0073476 A1 | 4/2004 | Donahue et al. |
| 2004/0078388 A1 | 4/2004 | Melman |
| 2004/0107136 A1 | 6/2004 | Nemirofsky et al. |
| 2004/0117242 A1 | 6/2004 | Conrad et al. |
| 2004/0122083 A1 | 6/2004 | Pettit et al. |
| 2004/0122681 A1 | 6/2004 | Ruvolo et al. |
| 2004/0122735 A1 | 6/2004 | Meshkin |
| 2004/0122855 A1 | 6/2004 | Ruvolo et al. |
| 2004/0128183 A1 | 7/2004 | Challey et al. |
| 2004/0128283 A1 | 7/2004 | Wang et al. |
| 2004/0128320 A1 | 7/2004 | Grove et al. |
| 2004/0143731 A1 | 7/2004 | Audebert et al. |
| 2004/0148232 A1 | 7/2004 | Fushimi et al. |
| 2004/0172323 A1 | 9/2004 | Stamm |
| 2004/0172379 A1 | 9/2004 | Mott et al. |
| 2004/0174979 A1 | 9/2004 | Hutton et al. |
| 2004/0186766 A1 | 9/2004 | Fellenstein et al. |
| 2004/0199496 A1 | 10/2004 | Liu et al. |
| 2004/0199905 A1 | 10/2004 | Fagin et al. |
| 2004/0204989 A1 | 10/2004 | Dicker et al. |
| 2004/0204991 A1 | 10/2004 | Monahan et al. |
| 2004/0230989 A1 | 11/2004 | Macey et al. |
| 2004/0240642 A1 | 12/2004 | Crandell et al. |
| 2004/0249727 A1 | 12/2004 | Cook Jr. et al. |
| 2004/0267717 A1 | 12/2004 | Slackman |
| 2005/0002166 A1 | 1/2005 | Dinnage et al. |
| 2005/0010925 A1 | 1/2005 | Khawand et al. |
| 2005/0038733 A1 | 2/2005 | Foster et al. |
| 2005/0044254 A1 | 2/2005 | Smith |
| 2005/0055306 A1 | 3/2005 | Miller et al. |
| 2005/0060664 A1 | 3/2005 | Rogers |
| 2005/0097204 A1 | 5/2005 | Horowitz et al. |
| 2005/0114229 A1 | 5/2005 | Ackley et al. |
| 2005/0120311 A1 | 6/2005 | Thrall |
| 2005/0131837 A1 | 6/2005 | Sanctis et al. |
| 2005/0144064 A1 | 6/2005 | Calabria et al. |
| 2005/0193333 A1 | 9/2005 | Ebert |
| 2005/0197846 A1 | 9/2005 | Pezaris et al. |
| 2005/0197950 A1 | 9/2005 | Moya et al. |
| 2005/0198031 A1 | 9/2005 | Pezaris et al. |
| 2005/0202390 A1 | 9/2005 | Allen et al. |
| 2005/0203888 A1 | 9/2005 | Woosley et al. |
| 2005/0216300 A1 | 9/2005 | Appelman et al. |
| 2005/0262067 A1 | 11/2005 | Lee et al. |
| 2005/0273378 A1 | 12/2005 | MacDonald-Korth et al. |
| 2006/0009994 A1 | 1/2006 | Hogg et al. |
| 2006/0010105 A1 | 1/2006 | Sarakkai et al. |
| 2006/0015498 A1 | 1/2006 | Sarmiento et al. |
| 2006/0031240 A1 | 2/2006 | Eyal et al. |
| 2006/0041638 A1 | 2/2006 | Whittaker et al. |
| 2006/0058048 A1 | 3/2006 | Kapoor et al. |
| 2006/0069623 A1 | 3/2006 | MacDonald Korth et al. |
| 2006/0085251 A1 | 4/2006 | Greene |
| 2006/0173817 A1 | 8/2006 | Chowdhury et al. |
| 2006/0206479 A1 | 9/2006 | Mason |
| 2006/0218049 A1 | 9/2006 | Walker et al. |
| 2006/0230035 A1 | 10/2006 | Bailey et al. |
| 2006/0235752 A1 | 10/2006 | Kavanagh et al. |
| 2006/0259360 A1 | 11/2006 | Flinn et al. |
| 2006/0271671 A1 | 11/2006 | Hansen |
| 2006/0282304 A1 | 12/2006 | Bedard et al. |
| 2007/0005424 A1 | 1/2007 | Arauz |
| 2007/0027760 A1 | 2/2007 | Collins et al. |
| 2007/0027814 A1 | 2/2007 | Tuoriniemi |
| 2007/0073641 A1 | 3/2007 | Perry et al. |
| 2007/0077025 A1 | 4/2007 | Mino |
| 2007/0078726 A1 | 4/2007 | MacDonald Korth et al. |
| 2007/0078849 A1 | 4/2007 | Slothouber |
| 2007/0083437 A1 | 4/2007 | Hamor |
| 2007/0094597 A1 | 4/2007 | Rostom |
| 2007/0100803 A1 | 5/2007 | Cava |
| 2007/0130090 A1 | 6/2007 | Staib et al. |
| 2007/0160345 A1 | 7/2007 | Sakai et al. |
| 2007/0162379 A1 | 7/2007 | Skinner |
| 2007/0174108 A1 | 7/2007 | Monster |
| 2007/0192168 A1 | 8/2007 | Van Luchene |
| 2007/0192181 A1 | 8/2007 | Asdourian |
| 2007/0206606 A1 | 9/2007 | Coleman et al. |
| 2007/0214048 A1 | 9/2007 | Chan et al. |
| 2007/0226679 A1 | 9/2007 | Jayamohan et al. |
| 2007/0233565 A1 | 10/2007 | Herzog et al. |
| 2007/0239534 A1 | 10/2007 | Liu et al. |
| 2007/0245013 A1 | 10/2007 | Saraswathy et al. |
| 2007/0260520 A1 | 11/2007 | Jha et al. |
| 2007/0282666 A1 | 12/2007 | Afeyan et al. |
| 2007/0288298 A1 | 12/2007 | Gutierrez et al. |
| 2007/0299743 A1* | 12/2007 | Staib ............... G06Q 30/0204 705/7.33 |
| 2008/0015938 A1 | 1/2008 | Haddad et al. |
| 2008/0021763 A1 | 1/2008 | Merchant |
| 2008/0052152 A1 | 2/2008 | Yufik |
| 2008/0071640 A1 | 3/2008 | Nguyen |
| 2008/0082394 A1 | 4/2008 | Floyd et al. |
| 2008/0103893 A1 | 5/2008 | Nagarajan et al. |
| 2008/0120342 A1 | 5/2008 | Reed et al. |
| 2008/0126205 A1 | 5/2008 | Evans et al. |
| 2008/0126476 A1 | 5/2008 | Nicholas et al. |
| 2008/0133305 A1 | 6/2008 | Yates et al. |
| 2008/0140765 A1 | 6/2008 | Kelaita et al. |
| 2008/0162574 A1 | 7/2008 | Gilbert |
| 2008/0195476 A1 | 8/2008 | Marchese et al. |
| 2008/0201218 A1 | 8/2008 | Broder et al. |
| 2008/0215456 A1 | 9/2008 | West et al. |
| 2008/0288338 A1 | 11/2008 | Wiseman et al. |
| 2008/0294536 A1 | 11/2008 | Taylor et al. |
| 2008/0300909 A1 | 12/2008 | Rikhtverchik et al. |
| 2008/0301009 A1 | 12/2008 | Plaster et al. |
| 2008/0305869 A1 | 12/2008 | Konforty et al. |

(56) References Cited

U.S. PATENT DOCUMENTS

| | | |
|---|---|---|
| 2008/0313010 A1 | 12/2008 | Jepson et al. |
| 2009/0006190 A1 | 1/2009 | Lucash et al. |
| 2009/0030755 A1 | 1/2009 | Altberg et al. |
| 2009/0030775 A1 | 1/2009 | Vieri |
| 2009/0037355 A1 | 2/2009 | Brave et al. |
| 2009/0106080 A1 | 4/2009 | Carrier et al. |
| 2009/0106127 A1 | 4/2009 | Purdy et al. |
| 2009/0110181 A1 | 4/2009 | Koenig et al. |
| 2009/0119167 A1 | 5/2009 | Kendall et al. |
| 2009/0157537 A1 | 6/2009 | Miller |
| 2009/0164323 A1 | 6/2009 | Byrne |
| 2009/0164442 A1 | 6/2009 | Shani et al. |
| 2009/0182589 A1 | 7/2009 | Kendall et al. |
| 2009/0204848 A1 | 8/2009 | Kube et al. |
| 2009/0222348 A1 | 9/2009 | Ransom et al. |
| 2009/0222737 A1 | 9/2009 | Liesche et al. |
| 2009/0228918 A1 | 9/2009 | Rolff et al. |
| 2009/0234722 A1 | 9/2009 | Evevsky |
| 2009/0240582 A1 | 9/2009 | Sheldon-Neal et al. |
| 2009/0276284 A1 | 11/2009 | Yost |
| 2009/0276305 A1 | 11/2009 | Clopp |
| 2009/0292677 A1 | 11/2009 | Kim |
| 2009/0293019 A1 | 11/2009 | Raffel et al. |
| 2009/0313173 A1 | 12/2009 | Singh et al. |
| 2010/0042684 A1 | 2/2010 | Broms et al. |
| 2010/0070448 A1 | 3/2010 | Omoigui |
| 2010/0076816 A1 | 3/2010 | Phillips |
| 2010/0076851 A1 | 3/2010 | Jewell, Jr. |
| 2010/0094673 A1 | 4/2010 | Lobo et al. |
| 2010/0107123 A1 | 4/2010 | Sareen et al. |
| 2010/0145831 A1 | 6/2010 | Esfandiar et al. |
| 2010/0146413 A1 | 6/2010 | Yu |
| 2010/0228617 A1 | 9/2010 | Ransom et al. |
| 2011/0010656 A1 | 1/2011 | Mokotov |
| 2011/0055054 A1 | 3/2011 | Glasson |
| 2011/0060621 A1 | 3/2011 | Weller et al. |
| 2011/0103699 A1 | 5/2011 | Ke et al. |
| 2011/0131253 A1 | 6/2011 | Peukert et al. |
| 2011/0145226 A1 | 6/2011 | Gollapudi et al. |
| 2011/0153383 A1 | 6/2011 | Bhattacharjya et al. |
| 2011/0153663 A1 | 6/2011 | Koren et al. |
| 2011/0173076 A1 | 7/2011 | Eggleston et al. |
| 2011/0191319 A1 | 8/2011 | Nie et al. |
| 2011/0196802 A1 | 8/2011 | Ellis et al. |
| 2011/0225050 A1 | 9/2011 | Varghese |
| 2011/0231226 A1 | 9/2011 | Golden |
| 2011/0231383 A1 | 9/2011 | Smyth et al. |
| 2011/0258049 A1 | 10/2011 | Ramer et al. |
| 2011/0271204 A1 | 11/2011 | Jones et al. |
| 2011/0276513 A1 | 11/2011 | Erhart et al. |
| 2011/0289068 A1 | 11/2011 | Teevan et al. |
| 2012/0005187 A1 | 1/2012 | Chavanne |
| 2012/0030067 A1 | 2/2012 | Pothukuchi et al. |
| 2012/0084135 A1 | 4/2012 | Nissan et al. |
| 2012/0158715 A1 | 6/2012 | Maghoul et al. |
| 2012/0164619 A1 | 6/2012 | Meer |
| 2012/0166299 A1 | 6/2012 | Heinstein et al. |
| 2012/0203723 A1 | 8/2012 | Huang et al. |
| 2012/0231424 A1 | 9/2012 | Calman et al. |
| 2012/0233312 A1 | 9/2012 | Ramakumar et al. |
| 2012/0278388 A1 | 11/2012 | Kleinbart et al. |
| 2012/0284336 A1 | 11/2012 | Schmidt et al. |
| 2012/0323725 A1 | 12/2012 | Johnston et al. |
| 2013/0031470 A1 | 1/2013 | Daly, Jr. et al. |
| 2013/0073392 A1* | 3/2013 | Allen ............... G06Q 30/0633 705/26.8 |
| 2013/0080200 A1 | 3/2013 | Connolly et al. |
| 2013/0080426 A1 | 3/2013 | Chen et al. |
| 2013/0085893 A1 | 4/2013 | Bhardwaj et al. |
| 2013/0144870 A1 | 6/2013 | Gupta et al. |
| 2013/0145254 A1 | 6/2013 | Masuko et al. |
| 2013/0151331 A1 | 6/2013 | Avner et al. |
| 2013/0151388 A1 | 6/2013 | Falkenborg et al. |
| 2013/0185164 A1 | 7/2013 | Pottjegort |
| 2013/0191409 A1 | 7/2013 | Zeng et al. |
| 2013/0254059 A1 | 9/2013 | Teo |
| 2013/0268561 A1 | 10/2013 | Christie et al. |
| 2014/0019313 A1 | 1/2014 | Hu et al. |
| 2014/0025509 A1 | 1/2014 | Reisz et al. |
| 2014/0032544 A1 | 1/2014 | Mathieu et al. |
| 2014/0114680 A1 | 4/2014 | Mills et al. |
| 2014/0136290 A1 | 5/2014 | Schiestl et al. |
| 2014/0172652 A1 | 6/2014 | Pobbathi et al. |
| 2014/0180758 A1 | 6/2014 | Agarwal et al. |
| 2014/0200959 A1* | 7/2014 | Sarb ............... G06Q 30/0202 705/7.31 |
| 2014/0259056 A1 | 9/2014 | Grusd |
| 2014/0289005 A1 | 9/2014 | Laing et al. |
| 2014/0337090 A1 | 11/2014 | Tavares |
| 2014/0372415 A1 | 12/2014 | Fernandez-Ruis |
| 2015/0019958 A1 | 1/2015 | Ying et al. |
| 2015/0089524 A1 | 3/2015 | Cremonesi et al. |
| 2015/0142543 A1 | 5/2015 | Lellouche |
| 2015/0286742 A1 | 10/2015 | Zhang et al. |
| 2015/0287066 A1 | 10/2015 | Wortley et al. |
| 2017/0344622 A1 | 11/2017 | Islam et al. |
| 2020/0065357 A1 | 2/2020 | Noursalehi et al. |

FOREIGN PATENT DOCUMENTS

| | | |
|---|---|---|
| EP | 0636993 | 4/1999 |
| EP | 0807891 | 5/2000 |
| EP | 1241603 | 9/2002 |
| GB | 2397400 | 7/2004 |
| GB | 2424098 | 9/2006 |
| JP | 2001283083 | 12/2001 |
| JP | 2002318935 | 10/2002 |
| JP | 2007021920 | 2/2007 |
| JP | 2009505238 | 2/2009 |
| WO | WO1997017663 | 5/1997 |
| WO | WO1998032289 | 7/1998 |
| WO | WO1998047082 | 10/1998 |
| WO | WO1998049641 | 11/1998 |
| WO | WO1999059283 | 11/1999 |
| WO | WO2000025218 | 5/2000 |
| WO | WO2001009803 | 2/2001 |
| WO | WO2001082135 | 11/2001 |
| WO | WO2001097099 | 12/2001 |
| WO | WO2002037234 | 5/2002 |
| WO | WO2003094080 | 11/2003 |
| WO | WO2007021920 | 2/2007 |
| WO | WO2012093410 | 7/2012 |
| WO | WO2015116038 | 8/2015 |
| WO | WO2015176071 | 11/2015 |

OTHER PUBLICATIONS

K. Gallagher and J. Parsons, "A framework for targeting banner advertising on the Internet," Proceedings of the Thirtieth Hawaii International Conference on System Sciences, 1997, pp. 265-274 vol.4, doi: 10.1109/HICSS.1997.663397. (Year: 1997).*

Lee, "Aucnet: Electronic Intermediary for Used-Car Transactions," Electronic Market—The International Journal, Dec. 1997, pp. 24-28, vol. 7, No. 4.

T.Y. Lee, S. Li and R. Wei, "Needs-Centric Searching and Ranking Based on Customer Reviews," 2008 10th IEEE Conference on E-Commerce Technology and the Fifth IEEE Conference on Enterprise Computing, E-Commerce and E-Services, Washington, DC, 2008, pp. 128-135. (Year: 2008).

Levy, Michael, and Dhruv Grewal. "Supply chain management in a networked economy." Journal Retailing 76.4 (2000): 415-429.

LIVE365 press release, "Live365 to Offer Opt-In Advertising on its Website," Oct. 15, 2004.

London Business School, "Overture and Google: Internet Pay-Per-Click (PPC) Advertising Options," Mar. 2003.

M2 Presswire, "Palm, Inc.: Palm unveils new web browser optimised for handhelds; HTML browser offers highspeed web-browsing option," Mar. 13, 2002.

Malone et al., "Electronic Markets and Electronic Hierarchies," Communications of the ACM, Jun. 1987, pp. 484-497, vol. 30, No. 6.

(56) References Cited

OTHER PUBLICATIONS

Mansell et al., "Electronic Trading Networks: The Route to Competitive Advantage?" Electronic Markets—The International Journal, Oct. 1993, 1 page, vol. 3, No. 3.
Mardesich, "Onsale takes auction gavel electronic," Computer Reseller News, Jul. 8, 1996, pp. 2, 32.
Marteau, "Shop with One Click, Anywhere, Anytime," Information Management and Consulting, 2000, pp. 44-46, vol. 15, No. 4.
Massimb et al., "Electronic Trading, Market Structure and Liquidity," Financial Analysts Journal, Jan.-Feb. 1994, pp. 39-49.
McGinnity, "Build Your Weapon," PC Magazine, Apr. 24, 2011, printed from www.pcmag.com/print_article2?0,1217,a%253D3955,00.asp.
Meade, "Visual 360: a performance appraisal system that's 'fun,'" HR Magazine, 44, 7, 118(3), Jul. 1999.
"Mediappraise: Mediappraise Receives National Award for Web-Based Technology That Enables Companies to Solve Thorny HR Problem," Dec. 14, 1998.
Medvinsky et al., "Electronic Currency for the Internet," Electronic Markets—The International Journal, Oct. 1993, 2 pages, vol. 3, No. 3.
metails.com, www.metails.com homepage, printed Oct. 13, 2004.
Microsoft Computer Dictionary, Fifth Edition, front matter and p. 33.
Microsoft Computer Dictionary, Fifth Edition, front matter, back matter, and pp. 479, 486.
Neches, "Fast—A Research Project in Electronic Commerce," Electronic Markets—The International Journal, Oct. 1993, 4 pages, vol. 3., No. 3.
Neisser, "Which is better for Social Media Monitoring: TweetDeck or SproutSocial" Mar. 17, 2011, Social Media Examiner, https://www.socialmediaexaminer.com/which-is-better-for-social-media-monitoring-tweetdeck-or-sproutsocial/.
Neo, "The implementation of an electronic market for pig trading in Singapore," Journal of Strategic Information Systems, Dec. 1992, pp. 278-288, vol. 1, No. 5.
O'Mahony, "An X.500-based Product Catalogue," Electronic Markets—The International Journal, Oct. 1993, 2 pages, vol. 3, No. 3.
"Onsale: Onsale Brings Thrill of Auctions and Bargain Hunting Online: Unique Internet retail services debuts with week-long charity auction for the Computer Museum in Boston," May 24, 1995, printed from www.dialogweb.com/cgi/dwclient?dwcommand,DWEBPRINT%20810-489267.
"Onsale joins fray as online shopping pcks up speed: Internet Booms," Comptuer Reseller News, Jun. 5, 1995.
Palm, Inc., PalmTM Web Pro Handbook, copyright 2002-2003.
Post et al., "Application of Auctions as a Pricing Mechanism for the Interchange of Electric Power," IEEE Transactions of Power Systems, Aug. 1995, pp. 1580-1584, vol. 10, No. 3.
Preist et al., "Adaptive agents in a persistent shout double auction," International Conference on Information and Computation, Proceedings of the first international conference on information and computation economies, Oct. 25-28, 1998, Charleston, United States, pp. 11-18.
Qualcomm, "Brew Developer Support," printed from web.archive.org/web/20020209194207/http://www.qualcomm.com/brew/developer/support/kb/52.html on Aug. 30, 2007.
RCR Wireless News, "Lockheed Martin to use 2Roam's technology for wireless platform," RCR Wireless News, Sep. 10, 2001.
Reck, "Formally Specifying an Automated Trade Execution System," J. Systems Software, 1993, pp. 245-252, vol. 21.
Reck, "Trading-Process Characteristics of Electronic Auctions," Electronic Markets—The International Journal, Dec. 1997, pp. 17-23, vol. 7, No. 4.
repcheck.com, www.repcheck.com homepage, printed from web.archive.org/web/20020330183132/http://repcheck.com on Sep. 5, 2009.
Resnick et al., "Reputation Systems," Communications of the ACM, Dec. 2000, pp. 45-48, vol. 43, No. 12.
Rockoff et al., "Design of an Internet-based system for remote Dutch auctions," Internet Research: Electronic Networking Applications and Policy, 1995, pp. 10-16, vol. 5, No. 4.
Rodriguez, Camille, HootSuite vs. social Oomph vs. Tweekdeck, Jan. 4, 2012, http://polkadotimpressions.com/2012/01/04/hootsuite-vs-social-oopmphvs.tweetdeck/ (Year: 2012).
Rose, "Vendors strive to undo Adobe lock-hold," Computer Reseller News, Feb. 5., 1996, n 66669, p. 71(7).
Ross, David Frederick, Frederick S. Weston, and W. Stephen. Introduction to supply chain management technologies. CRC Press, 2010.
Rysavy, "Mobile-commerce ASPs do the legwork," Network Computing, Jan. 22, 2001, p. 71, 6 pgs. , vol. 12, No. 2.
Saunders, "AdFlight to Offer WAP Ads," Oct. 17, 2000, printed from clickz.com/487531/print.
Schaffer, Neil, The Top 20 Twitter clients—HootSuite, TweetDeck and More, Jan. 31, 2012, https://maximizesocialbusinss.com/top-20-twitter-clients-2012-9175/ (Year: 2012).
Schmid, "Electronic Markets," Electronic Markets—The International Journal, Oct. 1993, 2 pages, vol. 3, No. 3.
Schwankert, "Matsushita Taps 2Roam for Wireless Solutions," www.internetnews.com/bus-news.article.php/674811, Feb. 2, 2001.
Sen, "Inventory and Pricing Models for Perishable Products," Doctor of Philosophy Dissertation—University of Southern California, Aug. 2000.
Siegmann, "Nowhere to go but up," PC Week, Oct. 23, 1995, 3 pages, vol. 12, No. 42.
Telephony Staff, "Air-ASP," Telephony Online, Oct. 2, 2000, 3 pages.
Teo, "Organizational Factors of Success in Using EDIS: A Survey of Tradenet Participants," Electronic Markets—The International Journal, Oct. 1993, 2 pages, vol. 3, No. 3.
Tjostheim et al., "A case study of an on-line auction for the World Wide Web," printed from www.nr.no/gem/elcom/puplikasjoner/enter98e.html on Jun. 10, 1990, 10 pages.
Turban, "Auctions and Bidding on the Internet: An Assessment," Electronic Markets—The International Journal, Dec. 1997, 5 pages, vol. 7, No. 4.
ubid.com, "How do I Updated my Address, Phone, Credit Card, Password, etc.?" printed from web.archive.org/web/20010208113903/www.ubid.com/help/topic13asp on Aug. 30, 2007.
ubid.com, "How do I track my shipment?" printed from web.archive.org/web/20010331032659/www.ubid.com/help/topic27.asp on Aug. 30, 2007.
ubid.com, "Can I track all of my bids from My Page?" printed from web.archive.org/web/20010208114049/www.ubid.com/help/topic14.asp on Aug. 30, 2007.
Van Heck et al., "Experiences with Electronic Auctions in the Dutch Flower Industry," Electronic Markets—The International Journal, Dec. 1997, 6 pages, vol. 7, No. 4.
Verizon Wireless, "Verizon Wireless Customers Get it NowSM; Get Games, Get Pix, Get Ring Tones and Get going in Full Color," press release to Prnewswire, Sep. 23, 2002.
Warbelow et al., "Aucnet: TV Auction Network System," Harvard Business School 9-190-001, Jul. 19, 1989, Rev. Apr. 12, 1996, pp. 1-15.
Weber, "How Financial Markets are Going on-line," Electronic Markets—The International Journal, Oct. 1993, 2 pages, vol. 3, No. 3.
Wireless Internet, "DailyShopper Selects 2Roam to Enable Mobile Customers to Retrieve Nearby Sales and Promotions Information," Wireless Internet, Apr. 2001.
Wireless Week, "Verizon Wireless Gets Going on Brew Agenda," Wireless Week, Sep. 23, 2002.
xchanger.net, webpage printed from www.auctiva.com/showcases/as_4sale.asp?uid=exchanger, undated but at least as early as Oct. 12, 2000.
Yu et al., "Distributed Reputation Management for Electronic Commerce," Computational Intelligence, 2002, pp. 535-549, vol. 18, No. 4.
Zetmeir, Auction Incentive Marketing, print of all pages of website found at home.earthlink.net/~bidpointz/ made Oct. 8, 2004.

(56) References Cited

OTHER PUBLICATIONS

Zimmermann, "Integration of Financial Services: The TeleCounter," Electronic Markets—The International Journal, Oct. 1993, 1 page, vol. 3, No. 3.

Zwass, "Electronic Commerce: Structures and Issues," International Journal of Electronic Commerce, Fall 1996, pp. 3-23, vol. 1, No. 1.

Message Passing from Wikipedia, archived May 6, 2016, retrieved from https://en.wikipedia.org/wiki/message_passing, 4 pages.

Di et al., "A New Implementation for Ontology Mapping Based enterprise Semantic Interoperation," by Xiaofeng Di and Yushun Fan, Applied Mechanics and Materials, vols. 16-19 (2009), pp. 644-648 (Year:2009).

Nicolle et a., "XML Integration and Toolkit for B2B Applications," by Christophe Nicolle, Kokou Yetongnon, and Jean-Claude Simon, Journal of Database Management, Oct.-Dec. 2003 (Year: 2003).

V. Aksakalli, Optimizing direct response in Internet display advertising, Elsevier, vol. 11, Issue 3, May-Jun. 2012, pp. 229-240. (Year: 2012).

Alex, Neil,"Optimizing Search Results in Elasticsearch with Scoring and Boosting", Mar. 18, 2015, Qbox.io, accessed at [https://qbox.io/blog/optimizing-search-results-in-elasticsearch0with-scoring-and-boosting] (year: 2015).

Hybrid algorithms for recommending new items. Cremonesi et al., ResearchGate, Google, (year:2011).

2Roam, Inc., multiple archived pages of www.2roam.com retrieved via Internet Archive Wayback Machine on Jun. 10, 2008.

Alt et al., "Bibliography on Electronic Commerce," Electronic Markets—The International Journal, Oct. 1993, 5 pages, vol. 3, No. 3.

Alt et al., "Computer Integrated Logistics," Electronic Markets—The International Journal, Oct. 1993, 1 page, vol. 1, No. 3.

Anonymous, Image manipulation (image-editing software and image-manipulation systems)(Seybold Special Report, Part II), Seybold Reporton Publishing Systems, May 15, 1995, pS35(9), vol. 24, No. 18.

auctionwatch.com, multiple pages—including search results for "expedition," printed Apr. 21, 2011.

auctiva.com, multiple pages, undated but website copyright date is "1999-2000."

Ball et al., "Supply chain infrastructures: system integration and information sharing," ACM SIGMOD Record, 2002, vol. 31, No. 1, pp. 61-66.

Berger et al., "Random Ultiple-Access Communication and Group Testing," IEEE, 1984.

Braganza, "IS Resarch at Cranfield—A Look at the Future," Electronic Markets—The International Journal, Oct. 1993, 1 page, vol. 3, No. 3.

Brecht et al., "The IM 2000 Research Programme," Electronic Markets—The International Journal, Oct. 1993, 1 page, vol. 3, No. 3.

Business Wire business/technology editors, "Sellers Flock to OutletZoo.com as New Automatic Price Drop Method Moves Excess Inventory Online," Business Wire, Oct. 25, 1999.

Business Wire business editors/high-tech writers, "PictureWorks Technology, Inc. Expands in Real Estate Market with Adoption of Rimfire on realtor.com," Business Wire, Nov. 8, 1999.

Business Wire business editors/high-tech writers, "PictureWorks Technology, Inc. Shows Strong Revenue Growth in Internet Imaging Business," Business Wire, Nov. 10, 1999.

Business Wire business editors/high-tech writers, "2Roam Partners with Pumatech to Delivery Wireless Alerts," Business Wire, Dec. 18, 2000.

Business Wire business editors/high-tech writers, "2Roam Takes eHow's How-to Solutions Wireless: With 2Roam, the Web's One-Stop Source for getting Things Done is on More Wireless Devices, with Ability to Purchase its Products from Anywhere," Business Wire, Oct. 2, 2000.

Business Wire business editors/high-tech writers, "2Roam Drives Hertz to the Wireless Web: Number One Car Rental Company to Provide Customers Wireless Access from Any Device," Business Wire, Aug. 7, 2001.

buy.com, www.buy.com homepage, printed Oct. 13, 2004.

Chen et al., "Detecting Web Page Structure for Adaptive Viewing on Small Form Factor Devices," ACM, May 20-24, 2003.

Chen, M. (2007). Knowledge assisted data management and retrieval in multimedia database systems (Order No. 3268643).

Y.K. Choi and S. K. Kim, "An auxiliary reccomendation system for repetitively purchasing items in E-commerce," 2014 International Conference on Big Data and Smart Computing (BIGCOMP), Bangkok, 2014, pp. 96-98. (Year 2014).

Clarke, "Research Programme in Supra-organizational Systems," Electronic Markets—The International Journal, Oct. 1993, 2 pages, vol. 3, No. 3.

Clemons et al., "Evaluating the prospects for alternative electronic securities markets," Proceedings of the twelfth International conference on information systems, New York, New York, United States, pp. 53-64, 1991.

Fan, J., Keim, F.A., Gao, Y., Luo, H. and Li, Z. (2009). JustClick: Personalized Image Recommendation via Exploratory Search from Large-Scale Flickr Images. Feb. 2009. IEEE Transactions on Circuits and Systems for Video Technology, 19(2), p. 2730288. (Year: 2009).

friendster.com, homepage and "more info" pages, printed Apr. 29, 2004.

Google News archive search for "2Roam marketing" performed over the date range 2000-2003.

Google News archive search for "2Roam SMS" performed over the date range 2000-2008.

Grabowski et al., "Mobile-enabled grid middleware and/or grid gateways," GridLab—A Grid Application Toolkit and Testbed, Work Package 12—Access for Mobile Users, Jun. 3, 2003.

Graham, "The Emergence of Linked Fish Markets in Europe," Electronic Markets—The International Journal, Jul. 1993, 4 pages, vol. 8, No. 2.

Gunthorpe et al., "Portfolio Composition and the Investment Horizon," Financial Analysts Journal, Jan.-Feb. 1994, pp. 51-56.

Halperin, "Toward a Process Handbook for Organizational Coordination Processes," Electronic Markets—The International Journal, Oct. 1993, 1 page, vol. 3, No. 3.

Hess et al., "Computerized Loan Origination Systems: An Industry Case Study of the Electronic Markets Hypothesis," MIS Quarterly, Sep. 1994, pp. 251-275.

IBM, "Anyonymous Delivery of Goods in Electronic Commerce," IBM Technical Disclosure Bulletin, Mar. 1996, pp. 363-366, vol. 39, No. 3.

IBM, "Personal Optimized Decision/Transaction Program," IBM Technical Disclosure Bulletin, Jan. 1995, pp. 83-84, vol. 38, No. 1.

Icrossing, "Icrossing Search Synergy: Natural & Paid Search Symbiosis," Mar. 2007.

IEEE 100—The Authoritative Dictionary of IEEE Standard Terms, Seventh Edition, 2000. Entire book cited; table of contents, source list, and terms beginning with A included. ISBN 0-7381-2601-2a.

Ives et al., "Editor's Comments—MISQ Central: Creating a New Intellectual Infrastructure," MIS Quarterly, Sep. 1994, p. xxxv.

Joshi, "Information visibility and its effect on supply chain dynamics," Ph D. dissertation, Massachusetts Institute of Technology, 2000 (fig. 4.5; p. 45).

Klein, "Information Logistics," Electronic Markets—The International Journal, Oct. 1993, pp. 11-12, vol. 3, No. 3.

Klein, "Introduction to Electronic Auctions," Electronic Markets—The International Journal, Dec. 1997, 4 pages, vol. 7, No. 4.

Kubicek, "The Organization Gap," Electronic Markets—The International Journal, Oct. 1993, 1 page, vol. 3, No. 3.

S. Kulkarni, A. M. Sankpal, R.R. Mudholkar and Kirankumari, "Recommendation engine: Matching individual/group profiles for better shopping experience," 2013 15th International Conference on Advanced Computing Technologies (ICACT), Rajampet, 2013, pp. 1-6. (Year: 2013).

Kuula, "Telematic Services in Finland," Electronic Markets—The International Journal, Oct. 1993, 1 page, vol. 3, No. 3.

(56) References Cited

OTHER PUBLICATIONS

Lalonde, "The EDI World Institute: An International Approach," Electronic Markets—The International Journal, Oct. 1993, 1 page, vol. 3, No. 3.

Lee et al., "Intelligent Electronic Trading for Commodity Exchanges," Electronic Markets—The International Journal, Oct. 1993, 2 pages, vol. 3, No. 3.

Lee et al., "Electronic Brokerage and Electronic Auction: The Impact of IT on Market Structures," Proceedings of the 29th Annual Hawaii International Conference on System Sciences, 1996, pp. 397-406.

\* cited by examiner

SYSTEM AND METHOD OF PERSONALIZING ONLINE MARKETING CAMPAIGNS

CROSS-REFERENCE TO RELATED APPLICATIONS

This application is a continuation of U.S. application Ser. No. 13/968,248, filed Aug. 15, 2013, now U.S. Pat. No. 10,929,890, which is hereby incorporated by reference in its entirety.

STATEMENT REGARDING FEDERALLY SPONSORED RESEARCH OR DEVELOPMENT

Not Applicable.

BACKGROUND

1. The Field of the Present Disclosure

The present disclosure relates generally to electronic commerce, and more particularly, but not necessarily entirely, to personalization of electronically generated content.

2. Description of Related Art

The growth of electronic commerce ("e-commerce") has led to a dramatic increase in the number of websites offering products and services for sale. E-commerce, in its broadest sense, refers generally to the conducting of business communications and transactions over networks through computers. More specifically, e-commerce refers to the buying and selling of goods and services, and the transfer of funds, through digital communications. As used herein, e-commerce refers to both of the above descriptions.

Many e-commerce websites are personalized such that each user may be presented with a unique experience to maximize the possibility of a sale. Personalization of the e-commerce website may be based on a user's historical online behavior and demographic information known about the user. Using the user's historical online behavior and known demographic information, a website attempts to predict the interests of the user. These predicted interests are then used to customize the presentation of the webpages of the website. For example, a webpage may include an advertisement for a product that is predicted to be of interest to a user based on the user's past purchase history. It will be appreciated that these personalization techniques may be utilized in conjunction with marketing campaigns.

To identify and track users, e-commerce websites employ user online identifiers. For example, websites may download small segments of data known as tracking cookies to the users' electronic devices. These tracking cookies typically contain some kind of ID number that allows the website to identify the electronic devices. Typically, when an electronic device accesses a website, the website requests that the electronic device's web browser provide the tracking cookie stored in the memory of the electronic device. Using the tracking cookie, the website is able to identify the electronic device's previous online history. For example, the website may be able to determine product listings previously accessed by an electronic device or online purchases made using the electronic device. The website may also be able to identify any user accounts associated with the electronic device. The website may also be able to access demographic information previously associated with the electronic device using the tracking cookie. This may include the gender, age, and interests of a user of the electronic device.

One drawback to the use of tracking cookies for personalization purposes is that the website cannot identify the specific users accessing the website based on the tracking cookies. That is, tracking cookies only identify the electronic device itself and not the actual user. (In reality, tracking cookies are actually browser specific.) Thus, any historical information stored by the website for a particular tracking cookie may be device specific and not user specific. For example, in a situation where multiple users use the same electronic device to access the same e-commerce website, the website does not know which of the users is actually using the electronic device at any given time. In this situation, personalization may be totally ineffective, or even offensive, because the personalization may be directed to a user that is not actually using the electronic device.

Personalization is further complicated by the fact that a user may access a website from multiple electronic devices used by multiple other users. For example, a user may access a website from a home computer, a work computer, and a smart phone, each of which may have its own tracking cookie. However, a spouse of the user may also use the same home computer making it difficult to know which user is actually online at any given time.

Personalization is even further complicated by the fact that a user may use multiple accounts with an e-commerce website or multiple users may use a single account to make purchases through an e-commerce website, such as in a familial situation. Likewise, users may have multiple email accounts through which they access an e-commerce website.

From the above, it can be seen that correctly identifying an actual user of an electronic device for personalization purposes is virtually impossible. Further, erroneous identification of the actual user using an electronic device may result in lost sales opportunities. For example, a user presented with a personalized webpage customized for a different user may lose interest and leave the website. In some instances, a user presented with personalized content targeted for another user may even be offended or annoyed. Likewise, a targeted user may not want another user to be targeted with personalized content intended for the targeted user.

While the above-described problems identifying actual users may never be eliminated in their entireties, it would be an improvement over the prior art to provide a system and method for enhanced personalization techniques that improve the probability of a sale in a multi-user, multi-device environment.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the present disclosure will be set forth in the description that follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
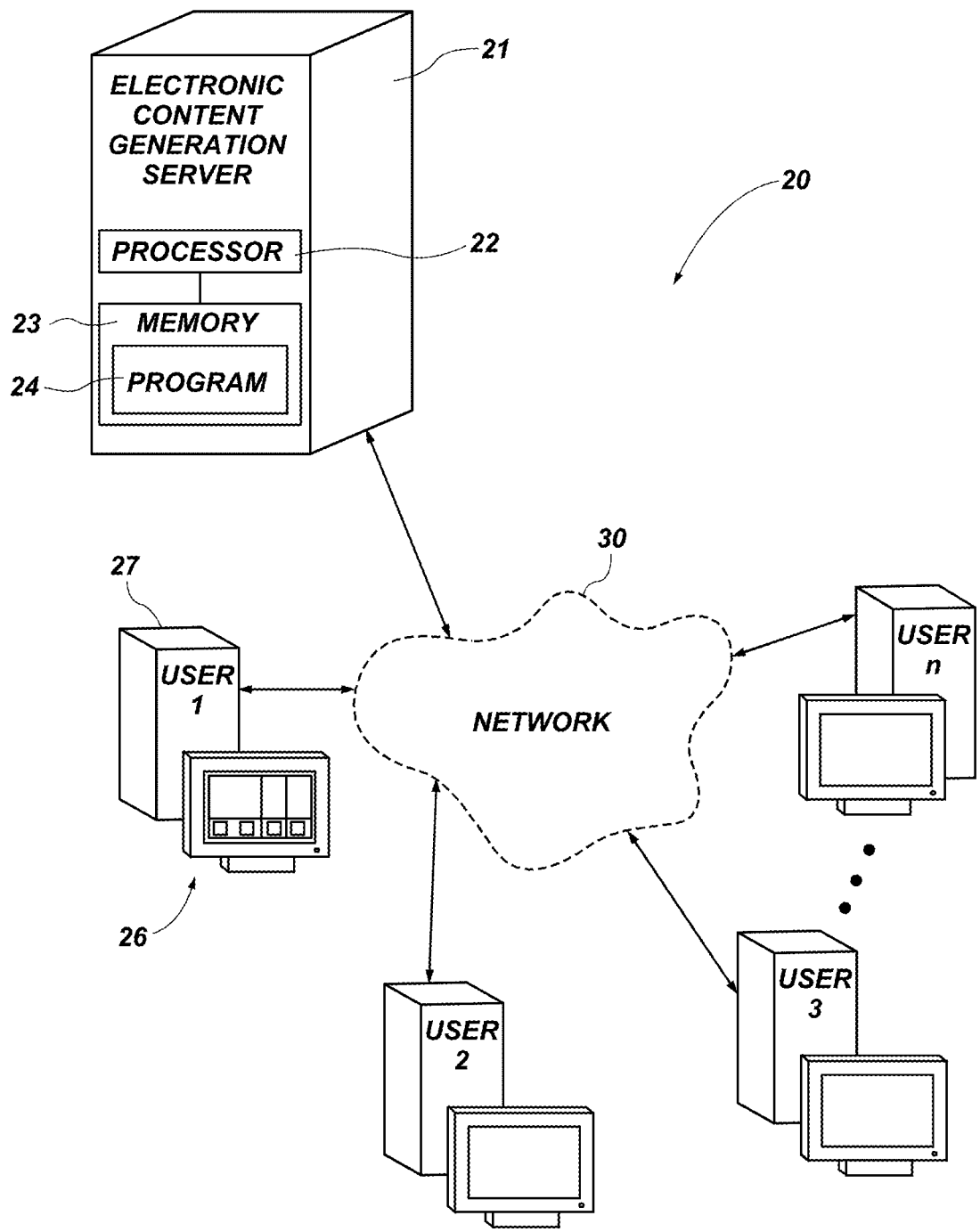
FIG. 1 is a diagram of a system for generating personalized electronic content according to an illustrative embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. It must be noted that, as used in this specification and the appended claims, the singular forms "a," "an," and "the" include plural referents unless the context clearly dictates otherwise. As used herein, the terms "comprising," "including," "containing," "having," "characterized by," and grammatical equivalents thereof are inclusive or open-ended terms that do not exclude additional, unrecited elements or method steps.

Referring now to FIG. 1, there is depicted a system 20 for providing enhanced personalized electronic content to users. In an illustrative embodiment, the personalized electronic content may be customized webpages of a website, such as an e-commerce website. In an illustrative embodiment, the personalized electronic content may be a body of an email utilized in an email-marketing campaign. In an illustrative embodiment, the personalized electronic content may be banner ads or other advertisements displayed on a website or in electronic communications. According to examples of embodiments of the present invention, the system 20 can be positioned to provide personalized electronic content on an online retailer/wholesaler website, sometimes referred to as an e-commerce website, or in the body of emails. The system 20 may include an electronic content generation server 21. In an embodiment, the server 21 is part of an e-commerce enterprise that hosts an e-commerce website, as is known to those of ordinary skill. In an embodiment, the server 21 is a bulk email server for generating emails for use in email-marketing campaigns.

The server 21 may include a processor 22 and memory 23. One or more second computers, e.g., user computers 27, positioned remote from and in communication with the web server 21 through an electronic communication network 30, such as the Internet or other internetwork. The system 20 can also include an electronic content generation program 24 stored on a tangible computer medium, such as, for example, one or more various types of memory, such as, for example, memory 23 of the server 21. The program 24 may contain instructions, that when executed by the processor 22, cause the processor 22 to provide personalized electronic content on the remote computers 27. The system 20 can also include a plurality of database servers (not shown) that warehouse data regarding e-commerce conducted through the system 20. The warehoused data may include user demographic and tracked online behavior. The data may include online advertisements created by a marketing department.

As understood by those skilled in the art, the memory 23 of the server 21 can include volatile and nonvolatile memory known to those skilled in the art including, for example, RAM, ROM, and magnetic or optical disks, just to name a few. It should also be understood by those skilled in the art that, although illustrated as a single server, the illustrated configuration of the server 21 is given by way of example and that other types of servers or computers configured according to various other methodologies known to those skilled in the art can be used. The server 21 shown schematically in FIG. 1 represents a server or server cluster or server farm and is not limited to any individual physical server. The server site may be deployed as a server farm or server cluster managed by a server-hosting provider. The number of servers and their architecture and configuration may be increased based on usage, demand, and capacity requirements for the system 20. Similarly, the database servers (not shown) each represent a server or server cluster or server farm and are not limited to any individual physical server or configuration.

As understood by those skilled in the art, the user computers 27 can be laptops, desktops, personal digital assistants or PDAs, cell phones, smart phones, mobile phones, servers, home computers, work computers, Internet-enabled devices, digital music players, smart TVs, or other types of processor-based computing devices. As known and understood by those skilled in the art, the network 30 can include an internet or world wide web of a plurality of computers/ servers in communication with one or more other computers through a communication network, and/or portions of a local or other area network.

As further understood by those skilled in the art, the program 24 can be in the form of microcode, programs, routines, and symbolic languages that provide a specific set for sets of ordered operations that control the functioning of the hardware and direct its operation, as known and understood by those skilled in the art. The program 24, according to an embodiment of the present invention, also need not reside in its entirety in volatile memory, but can be selectively loaded, as necessary, according to various methodologies as known and understood by those skilled in the art. As further understood by those skilled in the art, the term "computer-readable medium" encompasses distribution media, intermediate storage media, execution memory of a computer, and any other medium or device capable of storing the program 24 implementing the functionality or processes of various embodiments of the present invention for later reading by a computer. The program 24 can be copied from the computer-readable medium to a hard disk or a similar intermediate storage medium. When the program 24, or portions thereof, are to be run, it can be loaded either from their distribution medium or their intermediate storage medium into the execution memory of the computer, configuring the computer to act in accordance with the functionality or method of various embodiments of this invention. All such operations are well known to those skilled in the art of computer systems.

According to an exemplary embodiment of the present invention, the program 24 can include a set of instructions that when executed by the processor 22, cause the server 21, to perform the operations of generating personalized electronic content for transmission and display on the user computers 27. In an embodiment, the personalized electronic content may comprise one or more customized webpages dynamically generated by the server 21. The customized webpages may be displayed in web browsers running on the user computers 27. The customized webpages may include variations of layout, colors, themes, information, product recommendations, and advertisements. In an illustrative embodiment, the personalized electronic content may be the body of an email sent to users. The users may view the emails using an email program running on the user computers 27. Thus, it will be appreciated that the personalized electronic content may be any electronic content that may be viewed on the user computers 27 by users and is not limited to just webpages and emails. For example, the personalized electronic content may be displayed to users on the remote computers 27 on a webpage, as viewed, for example, on a display 26 of one or more remote user computers 27, through the communication network 30, e.g., Internet. In an embodiment, the personalized content may include social media content, or any other content generated for display to a user, including but not limited to, product recommendations and advertisements of all sorts.

Figure 2:
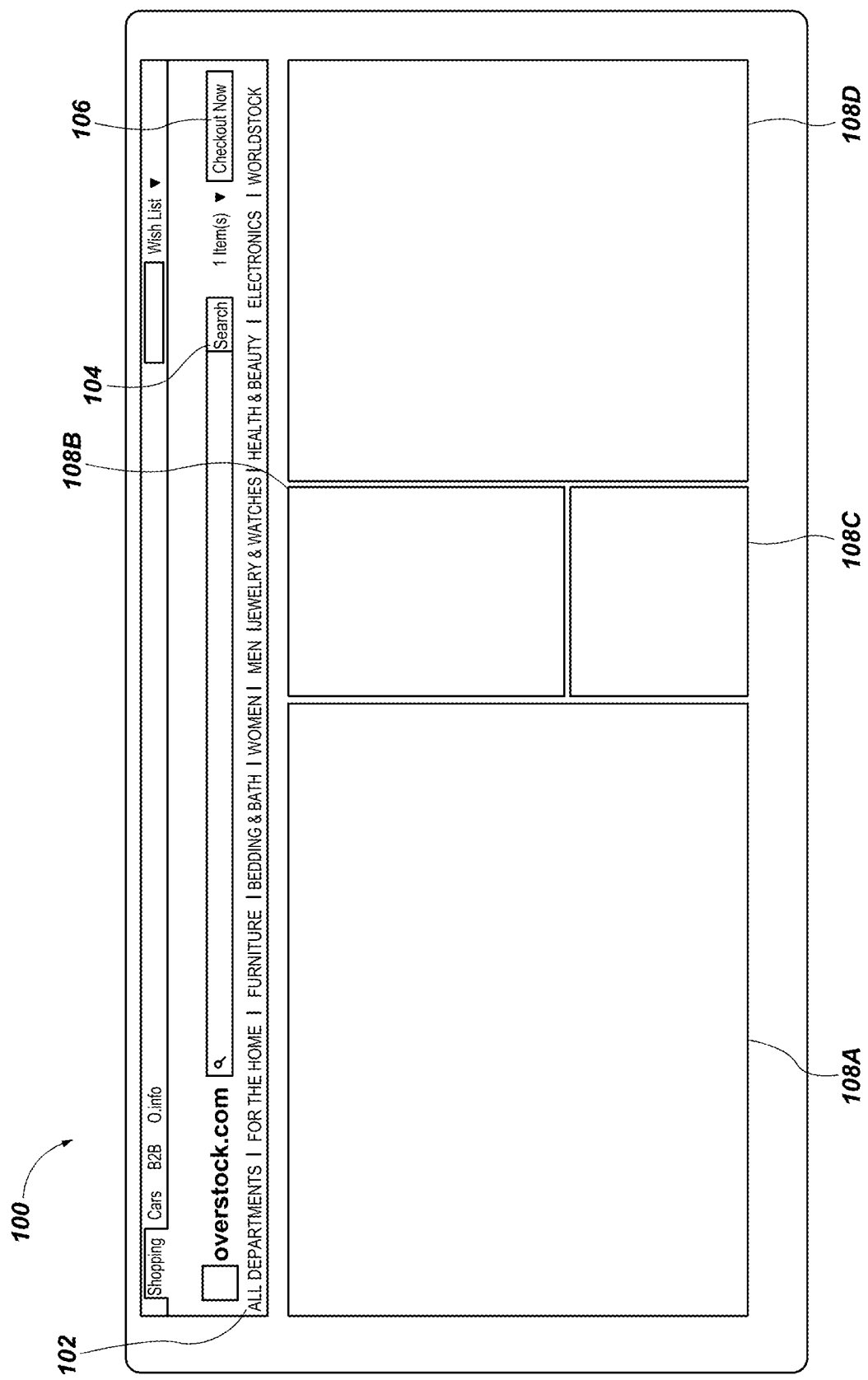
FIG. 2 depicts a webpage template according to an illustrative embodiment of the present disclosure.

Referring now to FIG. 2, there is depicted an exemplary webpage template 100 that may be used by the server 21 to generate a webpage with personalized content that is displayed on one of the user computers 27 using a web browser. The template 100 may include features common to all of the webpages generated using the template 100, including an interactive product taxonomy search bar 102 that provides links to different product categories, a search box 104 that allows users to conduct searches within the website, and an interactive link 106 to a checkout feature. The template 100 may be stored in a database accessible to the server 21.

In addition, the template 100 may further include empty frames 108A-108D. The frames 108A-108D may be able to display personalized advertising content as determined by the server 21. In an embodiment, the frames 108A-108D are populated by the server 21 with personalized electronic content using the present invention. The content in the frames 108A-108D may be interactive such that when selected by a user, the content in the frames 108A-108D directs a user to product listings or product category pages. Thus, it will be appreciated that the personalized content displayed in the frames 108A-108D may be varied from user to user to provide a personalized webpage from the template 100. In an embodiment, the template 100 may be for a homepage of an e-commerce website. It will be noted that the larger the frame, the more weight is given to the frame. For example, frame 108A is considered to have more weight than frames 108B and 108C since it is larger.

Figure 3:
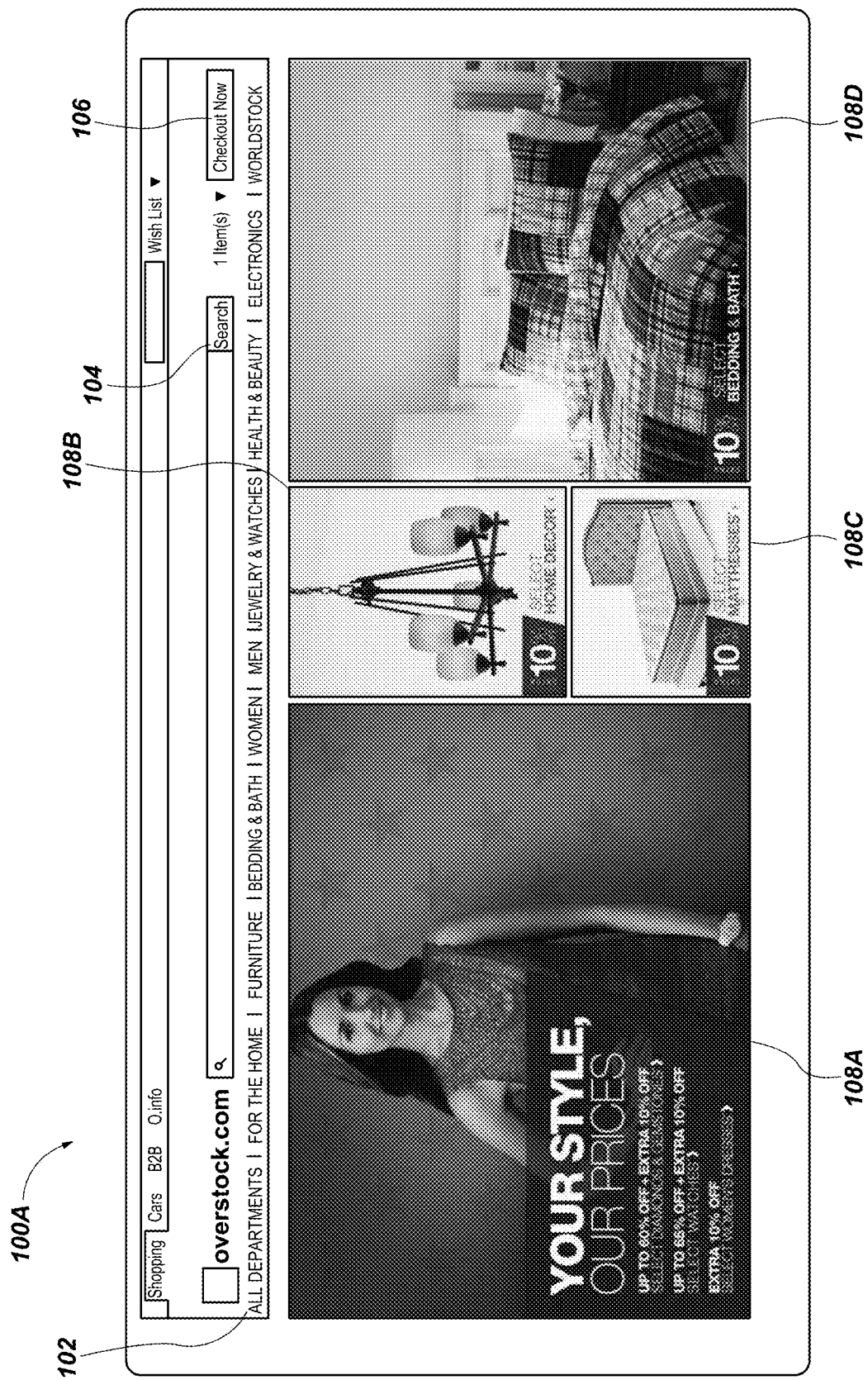
FIG. 3 depicts a webpage generated using the webpage template shown in FIG. 2 populated with personalized electronic content.

Referring now to FIG. 3, where like reference numerals depict like components, there is depicted an exemplary personalized webpage 100A generated by the server 21 using the template 100 shown in FIG. 2. As can be observed, the frames 108A-108D have been populated with personalized electronic content in the form of targeted advertisements selected by the server 21. The targeted advertisements may be selected by the server 21 using the personalization techniques that are described herein. It is important to note that the above discussion in relation to FIGS. 2 and 3 may also apply to generating personalized emails to users using an email template. That is, an email template may be populated with personalized content in the same manner by the server 21 according to the principles of the present invention.

In an illustrative embodiment, the personalized content generated by the server 21 may be targeted advertisements placed on a third-party website. For example, the personalized content may be a banner ad or other type of advertisement displayed on a news website. The banner ad may include an interactive link to an e-commerce website. Thus, it will be appreciated that personalized content may include product advertisements, targeted advertisements and product recommendations. In addition, personalized content may include customized search results and webpage layouts. In an embodiment, the personalized content may comprise at least one of targeted advertisements, product recommendations, banner advertisements, special promotions, webpages, invitations, emails, search results and sorted product lists. The manner of generating personalized electronic content will now be described below.

To generate personalized content, the electronic content generation server 21 tracks, stores, and maintains user interaction information under a master ID in a database. The master ID may be a numeric or alphanumeric identifier. In an embodiment, the master ID is a pre-existing master ID, and may comprise an online user identifier. In an illustrative embodiment, the user interaction information may include user interactions with websites, including e-commerce websites and any other type of websites. In an embodiment, the user interaction information may be tracked and recorded by another server, including a third-party tracking server as known to those of ordinary skill. The third-party tracking server may make the user interaction information available to the server 21. The user interaction information may include a wide range of data that may be utilized to assist in identifying and tracking a user or specific user computers 27 online, including user online identifiers.

In an illustrative embodiment, the user online identifiers may include user account information provided while creating a user account with a website. For example, users may be required to establish user accounts in order to conduct e-commerce with an e-commerce website. As known to those having ordinary skill, to establish a user account, a user may be required to complete a registration process that requires that the user provide a unique login ID and password. In addition, a user may be required to provide his or her first and last name, an email address, home address and a shipping address. The user may also be required to provide payment information, including a credit card number, billing name, and a billing address.

In an illustrative embodiment, the user online identifiers may include the tracking cookies of the user computers 27 through which a user accesses a user account on a website. For example, if a user is found to have accessed the same user account on an e-commerce website from multiple user computers 27, the server 21 tracks and records the tracking cookies of each of user computers 27 that accessed the same user account under the same master ID in the database. It will be appreciated a tracking cookie is a form of a unique tracking identifier. It will be further appreciated that as used herein, the term "unique tracking identifier" refers to tracking cookies, i.e., small pieces of data sent from a website and stored in a user's web browser, and data similar to tracking cookies, including unique identifiers used in a similar manner to tracking cookies to identify electronic devices.

In an illustrative embodiment, the server 21 tracks and records multiple email addresses utilized to login to the same user account and associates those email addresses under the same master ID in the database. For example, a user may utilize both a work and a personal email address to access the same user account on a website. (This may occur when a user clicks on an interactive link provided in a solicited or unsolicited email sent to the user's email addresses). Both the work and personal email addresses would be stored under the same master ID in the database by the server 21.

In an illustrative embodiment, the server 21 may run an automated procedure to determine if a user can be matched to other user accounts registered with other websites. For example, a user may have multiple user accounts with multiple websites. To accomplish this task, the server 21 may attempt to match user information associated with a first user account known to be associated with a targeted user with the user information associated with a second user account. For example, the server 21 may attempt to match a user's name, physical address, or email address associated with a first user account with a user's name, physical address, or email address of a second user account. In an illustrative embodiment, the server 21 may compare the last name and the first few letters of the first name to determine if a match exists. If the server 21 matches the user information of the first user account with the user information of the second user account, then the second user account may be associated to the master ID in the database in conjunction with the first user account.

In an illustrative embodiment, the server 21 may run an automated procedure to determine if multiple email addresses are associated with the same physical address or household. To accomplish this task, the server 21 may attempt to match user information associated with a first email address known to be associated with a targeted user with user information associated with a second email account. In an illustrative embodiment, the user information may be a physical address associated with the email addresses. For example, if two email addresses are associated with the same physical address, a match has been found. If a match is found, the second email address may be associated with the master ID in the database along with the first email address.

In an illustrative embodiment, the server 21 may track and record the different IP addresses through which a user account on a website is accessed. The server 21 may also track and record the IP addresses of the user computers 27 that access a website. The server 21 may also track and record the IP addresses of emails through which a website is accessed. These IP addresses are associated with the same master ID in the database by the server 21.

Figure 4:
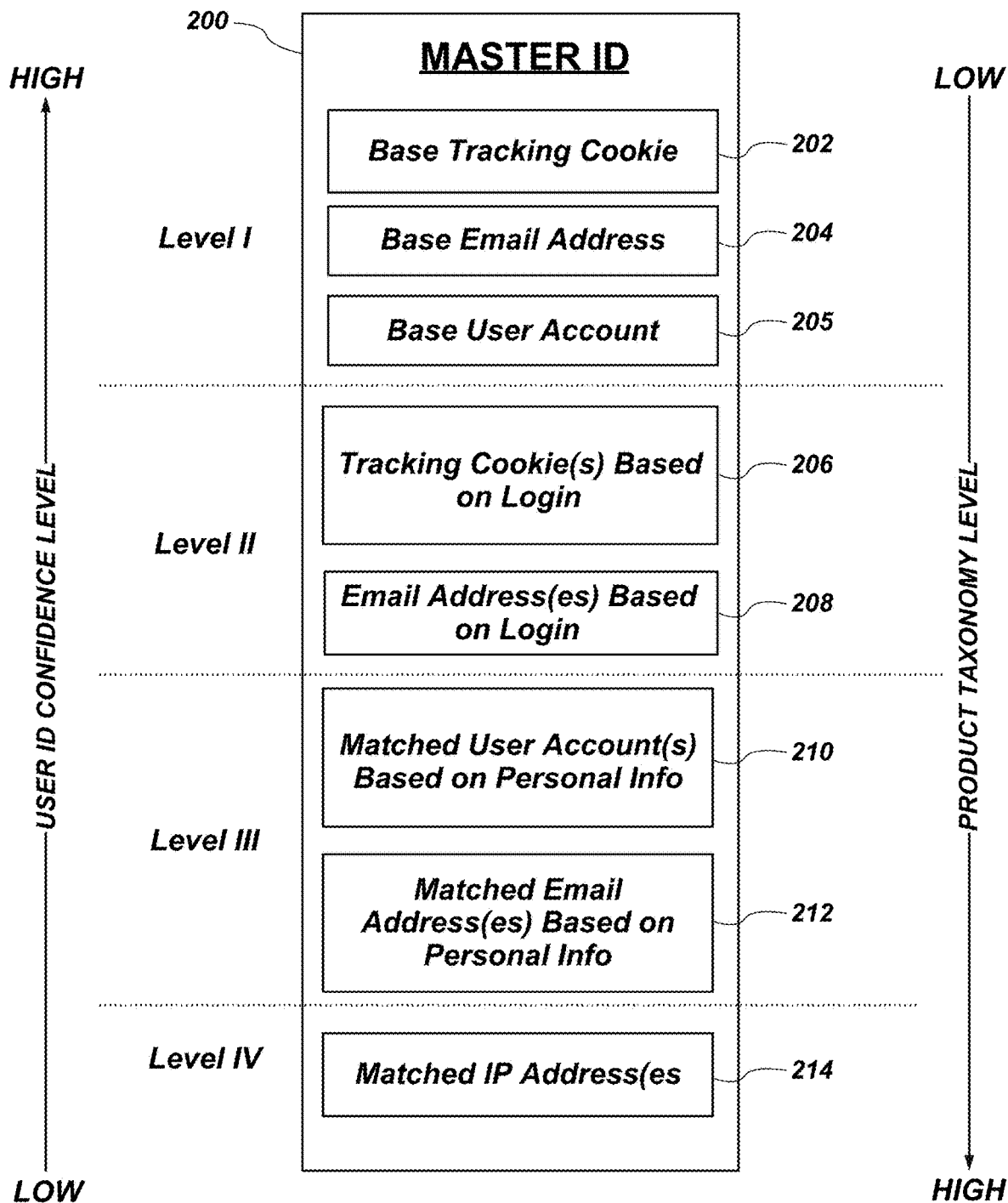
FIG. 4 is an exemplary table of user online identifiers associated with a master ID in a database.

Referring now to FIG. 4, as described above, the server 21 processes the user interaction information to centralize related user online identifiers under a single master ID, and more particularly, in a master ID table 200 stored in a database accessible to the server 21. In particular, when a user accesses a website for the first time, or establishes a user account, from one of the user computers 27 (see FIG. 1) through a web browser, the website places a tracking cookie in the memory of the user computer 27. The server 21 may associate the tracking cookie to a master ID by placing the tracking cookie in the master ID table 200. For purposes of the master ID, this "first" tracking cookie is referred to herein as the base tracking cookie 202 shown in FIG. 4.

When a user established a user account with the website through a registration process, this user account may become the base user account 205. During the registration process, the user may provide personal information, including login ID, password, first name, last name, and physical address.

In an illustrative embodiment, when a user provides an email address in association with creating the user account on the website, this email address becomes the base email address 204 associated with the master ID table 200 as shown in FIG. 4. In an embodiment, the base email address 204 may also be an email through which a user subscribes to a subscription or is provided by a lead generation. For example, if a user clicks through an advertisement in a solicited or unsolicited email, the user's email address may become the base email address 204.

As the server 21 tracks and records user interactions with a website, a user may login to his or her account from one or more of the other ones of the user computers 27. The website may transmit and store tracking cookies on the other ones of the user computers 27. The server 21 also stores these tracking cookies 206 of the other ones of the user computers 27 in the master ID table 200. In addition, if a user logs into his or her user account through email accounts that are not the base email account 204, the server 21 also stores these email addresses 208 in the master ID table 200.

In an illustrative embodiment, the server 21 may attempt to match other user accounts to the user account associated with the base user account 205. This may be done by matching personal information associated with each user account, such as name and physical address. If the server 21 matches other user accounts to the base user account 205, then those accounts are listed in the table 200 under matched user accounts 210. It will be appreciated that the matched user accounts 210 may be accounts on the same website as the base user account 205 or on other third-party websites.

In an illustrative embodiment, the server 21 may attempt to match other email addresses to the physical address associated with the base email address 204 through address matching. For example, if other email addresses are found to have the same physical address as that of the physical address associated with the base email address 204, then these other email addresses are stored in the table 200 as matched email addresses 212.

In an illustrative embodiment, the server 21 may also track and record the IP addresses for: (i) the user computer 27 associated with the base tracking cookie 202; (ii) the user computers 27 through which the user accesses his or her email; (iii) the user computers 27 through which the user logins to his or her account; and (4) any other user computer 27 that can be matched or linked to the user. These IP addresses are stored in the table 200 as IP address 214.

As can be observed, the user online identifiers in the master ID table 200 are logically divided into Levels I-IV. It will be appreciated that the logical division of the table 200 into Levels I-IV is for discussion purposes only and to assist in the disclosure of the present invention. That is, the table 200 may not actually be divided or arranged into separate levels when stored in a database. The division of the table 200 into Levels I-IV should therefore not be considered limiting on the scope of the present disclosure.

As can further be observed from FIG. 4, the user ID confidence level of the Level I data is the highest while the user ID confidence level of Level IV is the lowest. In practice, this means that personalization of electronic content based on the user online identifiers for Level I is likely to be more relevant than the personalization of electronic content for Level IV. In the context of e-commerce, the personalized content for Level I is more likely to result in a sale than for Levels II-IV. This may be true because of the decrease in the user ID confidence level. That is, users other than the targeted user may be utilizing the user online identifiers in Levels II-IV.

For example, personalizing electronic content solely based on matched IP addresses 214 may result in a user being presented with irrelevant and even offensive content because of the multiple numbers of other users that may be using the IP addresses 214. Nevertheless, this does not mean that the personalization of electronic content based on the data in Levels IV should be avoided. In fact, personalizing electronic content based on the data in Levels II-IV can be worthwhile if conducted pursuant to pre-defined usage parameters as will be discussed below.

Prior to proceeding, it is important to note that the manner in which the user online identifiers in table 200 may be utilized to generate personalized content in an embodiment of the present disclosure. In general, websites, or third-party tracking entities, track online user behavior to collect information about a user to predict product or product categories in which the user may be most interested. This generally involves the collection and analysis of click stream data and other online user behavior to create a score or profile that, as accurately as possible, identifies the user as a person who may be interested in certain products or content.

In an illustrative embodiment, collection of user online behavior data involves the tagging of websites to track and capture click stream data as the user browses a website. Data may be collected and stored in a database or data warehouse and are subjected to data mining algorithms to uncover patterns in browser behavior. The results of the data mining procedure are used to create the behavioral profile or score which may then be used to serve personalized content, including advertisements and product recommendations, matched to the predicted user behavior.

In an illustrative embodiment of the present disclosure, user data, including historical online behavior, demographic information, purchase history, and user preferences, are not stored under a user's actual name, but may be instead stored by the server 21 under user online identifiers, including tracking cookies, user accounts, email addresses, and IP addresses as shown in FIG. 4. The online user behavior tracked and collected may include, without limitation, purchase history, products viewed, webpages viewed, items abandoned in a virtual shopping cart, terms utilized in formulating search queries, websites visited, and browsing behavior. In addition, demographic information known about a user, such as age, gender, interests, hobbies, etc. may also be utilized to in predicting a user's interests. User data may comprise both historical online user behavior and demographic information.

It will be appreciated that the base tracking cookie 202, base email address 204, base user account 205, tracking cookies 206, email addresses 208, matched user accounts 210, matched email addresses 212, and IP addresses 214 may each have its own tracked and captured user behavioral data, and user demographic data, stored in a database that may be utilized to generate personalized content, including targeted advertisements. In an illustrative embodiment, the server 21 tracks and captures user online behavior for each of the base tracking cookie 202, base email address 204, base user account 205, tracking cookies 206, email addresses 208, matched user accounts 210, matched email addresses 212, and IP addresses 214. In an illustrative embodiment, one or more third-party servers track and capture user online behavior and demographic data for each of the base tracking cookie 202, base email address 204, base user account 205, tracking cookies 206, email addresses 208, matched user accounts 210, matched email addresses 212, and IP addresses 214.

In an illustrative embodiment, the server 21 is operable to generate personalized electronic content, such as targeted advertisements, based on the tracked and captured user online behavior and demographic data for each of the base tracking cookie 202, base email address 204, base user account 205, tracking cookies 206, email addresses 208, matched user accounts 210, matched email addresses 212, and IP addresses 214. In an illustrative embodiment, one or more third-party servers are operable to generate and provide to the server 21 personalized electronic content, such as targeted advertisements, based on the tracked and captured user online behavior and user demographic information for each of the base tracking cookie 202, base email address 204, base user account 205, tracking cookies 206, email addresses 208, matched user accounts 210, matched email addresses 212, and IP addresses 214.

It will be appreciated that using the online user behavior and demographic data associated with the base tracking cookie 202, base email address 204, base user account 205, tracking cookies 206, email addresses 208, matched user accounts 210, matched email addresses 212, and IP addresses 214 creates a more robust data set for personalization of electronically generated content.

In an illustrative embodiment, the present invention further contemplates applying content usage parameters to the electronically generated content to account for variations in the user ID confidence level. In particular, where the user ID confidence level is high, then the higher the degree of personalization of the personalized content. Where the user ID confidence level is low, the degree of personalization of the personalized content is reduced.

In this regard, the present invention takes into account that for some user online identifiers in FIG. 4, there is a possibility that the targeted user is not actually the user that will view the personalized content. For example, in the case where the user online identifier is an IP address, there is a possibility that the targeted user is not actually the user that will view the personalized content because multiple users may utilize the same IP address. Nevertheless, the present invention recognizes the benefit of still providing personalized content in this situation, albeit with a lesser degree of personalization so as not to drive away non-targeted users by presenting highly personalized content meant for another user.

Figure 5:
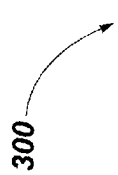
FIG. 5 is an exemplary table showing content usage parameters for the user online identifiers shown in FIG. 4.

Referring now to FIG. 5, there is depicted a table 300 containing an example of personalized content usage parameters for the different Levels I-IV of online user IDs stored in the master ID table 200 shown in FIG. 4. It will be appreciated that the usage parameters shown in FIG. 5 may vary in embodiments of the present disclosure. In an illustrative embodiment, the usage parameters determine the manner in which the electronically generated content is presented as well as filtering undesirable products or product categories from appearing in the personalized content.

As can be observed, for each of the Levels I-IV, there is provided in the table 300 the following rows: Recommended Messaging, Template, Adult Categories, Personal Sensitive, Personal Non-Sensitive, and Lowest Taxonomy Level. Each of these will now be explained.

Recommended Messaging refers to the prominence of the electronically generated content. That is, Recommended Messaging determines whether the electronically generated content is explicit or implicit in its targeting of a user. Explicit content makes clear that the user is being targeted, while implicit advertising does not make targeting clear. For example, where a user's previous online behavior predicts that the user may be interested in a diamond wedding ring previously viewed in a product listing, explicit content may include an image of the actual ring previously viewed by the user along with a statement inviting the user by name to purchase the ring. Implicit content, on the other hand, may simply include a general advertisement for wedding rings. Thus, explicit content is more personalized than implicit content.

The Template row in FIG. 5 refers to the fact that each of the Levels I-IV may have different templates. In an illustrative embodiment, the different templates may vary the degree of personalization of the electronically generated content. The templates may include webpage templates and email templates.

In an illustrative embodiment, the content usage parameters may include product filters. The Adult Categories row in FIG. 5 is an example of product categories that are automatically excluded, i.e., filtered, from appearing in personalized content for all of Levels I-IV. An example of an excluded adult category may be lingerie. The Personal Sensitive and Personal Non-Sensitive rows are example of product categories that are excluded or filtered for some of Levels I-IV but included in other ones of Levels I-IV. An example of a personal sensitive category may be caskets. An example of a personal non-sensitive category may be men's shoes.

It will be appreciated that some of the products or categories in a product taxonomy of an e-commerce website may be identified as adult, sensitive, or non-sensitive in a database. In an illustrative embodiment, this identification may be done manually by an operator of the server 21. In an illustrative embodiment, the server 21 may automate the identification.

Lowest Taxonomy Level refers to the lowest level of a product taxonomy tree that will be presented to a user for the Levels I-IV. Product level refers to the lowest node in a product taxonomy tree and may be an actual product offered for sale. Product level +1 refers to the next level just above the product level. Product level +2 refers to second level above the product level. Product level +3 refers to third level above the product level. In this regard, product level +1, product level +2, and product level +3, are subcategories in a product taxonomy tree while product level may be an actual product. (The arrow labeled "Product Taxonomy Level" in FIG. 4 represents this concept.)

From FIGS. 4 and 5, it can be observed that the higher the user ID confidence level, the greater the degree of personalization of the electronic content. Likewise, it can be observed that the lower the user ID confidence level, the lesser the degree of personalization of the electronic content. It can be further observed that each of Levels I-IV may have its own advertising preferences and product filters.

Figure 6:
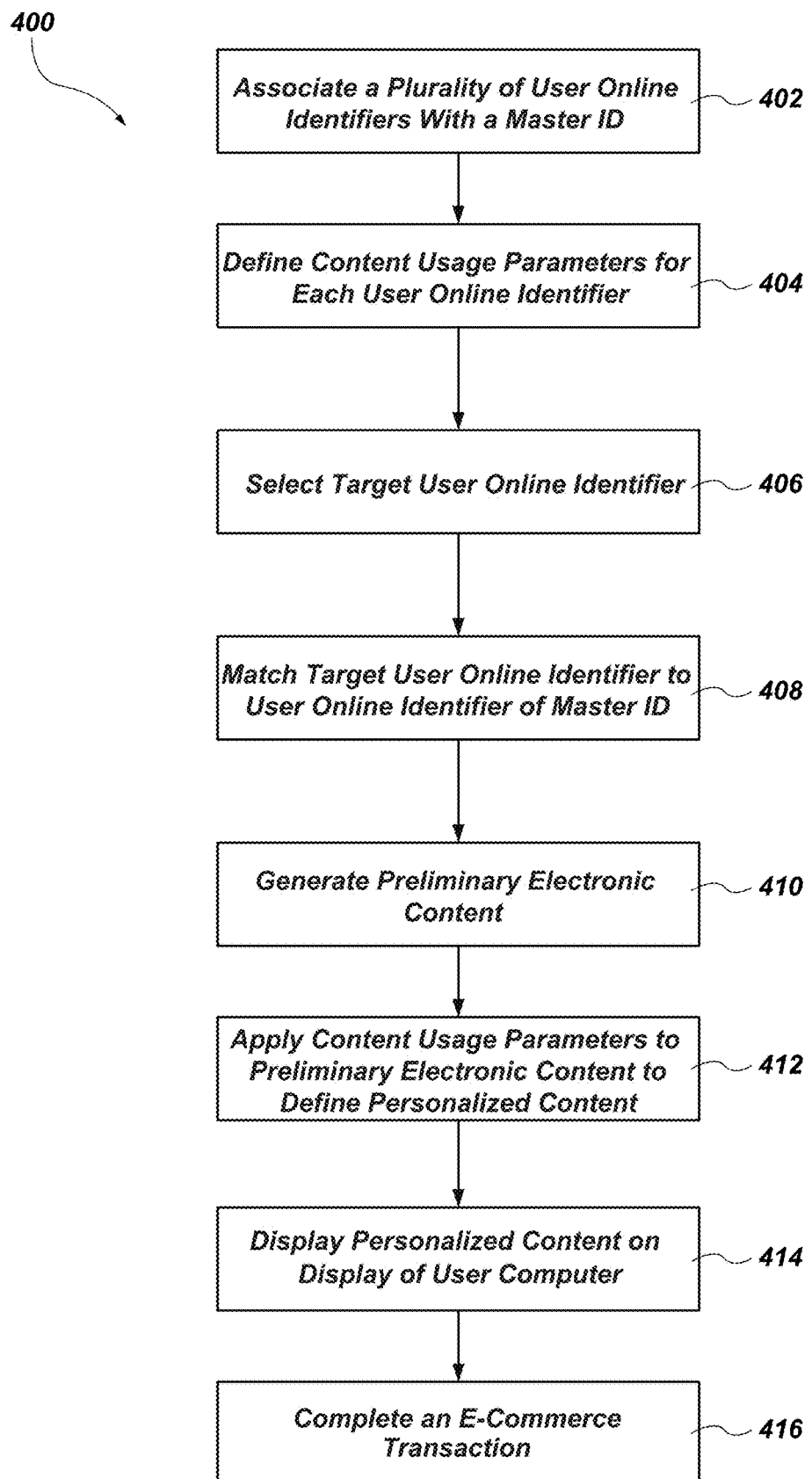
FIG. 6 is a flow diagram of a process for generating personalized electronic content according to an illustrative embodiment of the present disclosure.

Referring now to FIG. 6, there is depicted a flow diagram 400 of a process according to an illustrative embodiment of the present disclosure. It will be appreciated the process of the diagram 400 may be performed by the processor 22 of the server 21 as it executes the instructions of the program 24. It will be appreciated that the process of the diagram 400 may contain more or fewer steps than shown in FIG. 6. It will further be appreciated that the steps shown in the diagram 400 are not limited to any particular order and may be performed in a different order than the order shown.

At step 402, a plurality of user online identifiers are associated in a database under a master ID. The master ID may be a numeric or alphanumeric identifier. The user online identifiers may include tracking cookies, email addresses, user accounts, IP addresses, or any other user online identifier utilized to track and monitor user behavior while online. The tracking cookies may include unique identifying data stored in the memory of user computers as known to those of ordinary skill. The tracking cookies may include tracking cookies from multiple user computers used to login to the same user account on a website.

The email addresses may include an email address provided by a user in association with a subscription, account creation, or lead generation. The email addresses may also include multiple email addresses linked to a single user account through login. For example, the email addresses may include a home and work email address for a user that are utilized to login to the same user account on a website.

The user accounts may include user accounts matched to a known user account for a user. The user accounts may be matched by comparing personal identifying information such as last name, first name, and a physical or mailing address. A user account that has the same last name, first name, and/or physical or mailing address is likely to be the same user of another user account that has the same last name, first name, and/or physical or mailing address.

Likewise, the email accounts may include email accounts matched by a physical or mailing address to a known address for a user. Again, an email account that has associated therewith the same last name, first name, and/or physical or mailing address is likely to be the same user of another email account that has the same last name, first name, and/or physical or mailing address. The IP addresses may include IP addresses that are used by the user computers to access a user account on a website.

It will be appreciated that the user online identifiers associated with the master ID may each have stored in a database associated tracked online behavior and/or demographic information that may be utilized to generate personalized content based upon predicted behavior.

At step 404, a set of content usage parameters is defined or assigned for each of the user online identifiers. Each set may contain a recommended messaging type, i.e., explicit or implicit. Each set may further include a template variant. Each set may further include product filters that exclude certain categories of products or products in a product taxonomy tree and also identifies the lowest level in the product taxonomy tree that may be presented for the associated user online identifier.

At step 406, a targeted user online identifier for a user is provided, identified, or selected. In an illustrative embodiment, the targeted user online identifier is obtained during a user's visit to a website. In association with the visit, the targeted user online identifier for the user is obtained. In an illustrative embodiment, the targeted user online identifier may be a tracking cookie stored on a user computer. In an illustrative embodiment, the targeted user online identifier is an email account. In an illustrative embodiment, the targeted user online identifier is a user account. In an illustrative embodiment, the targeted user online identifier is an IP address. Multiple targeted user online identifiers may be obtained at this step. For example, the target user online identifiers may include a tracking cookie, a user account, and an IP address. In an illustrative embodiment, the user online identifier is a targeted email address obtained from a list of targeted users in conjunction with an email marketing campaign.

At step 408, the target user online identifier(s) obtained at step 406 are compared to a plurality of user online identifiers stored in the database under master IDs. If a match is found, the corresponding master ID is identified, selected, and stored.

At step 410, preliminary electronic content is generated using the user online behavior for one or more of the user online identifiers associated with the selected master ID. The preliminary electronic content may identify one or more entries in a product taxonomy tree that are predicted to be of interest to the user.

At step 412, the set of content usage parameters corresponding to the targeted user online identifier(s) obtained at step 406 is applied to the preliminary electronic content generated at step 410 to generate personalized content.

At step 414, the personalized content generated at step 412 is displayed on a display of the user's computer. In an illustrative embodiment, the personalized content may be transmitted over a network and displayed in a web browser on the user computer. In an illustrative embodiment, the personalized content may be used to populate a template. In an illustrative embodiment, the personalized content may be a targeted advertisement for a product or a service. In an illustrative embodiment, the personalized content may be a banner add displayed on a third-party website. In an illustrative embodiment, the generated personalized content may be in a body of an email. The personalized content may be interactive such that a user can click through to an e-commerce website as known to those of ordinary skill. It will be appreciated the personalized content may include content for multiple targeted user online identifiers. In this regard, multiple sets of content usage parameters may be used to generate the personalized content.

At step 416, the user may complete an e-commerce transaction for a product or server advertised in the personalized content on an e-commerce website.

Example 1

A user requests a homepage of an e-commerce website from a server through a web browser running on a user computer as known to those of ordinary skill. Prior to generating the homepage, the server requests a tracking cookie previously stored on the user computer. Upon receiving the tracking cookie, the server compares the targeted tracking cookie to a database of tracking cookies. Upon finding a match to the tracking cookie of the user computer in the database, the server identifies, selects, and stores a master ID associated with the tracking cookie found in the database. Using the master ID, the server is able to identify other user online identifiers associated with the master ID.

Using one or more of the user online identifiers associated with the master ID, the server is able to generate preliminary electronic content based on user online behavior that was previously tracked and stored. Then, the server applies to the preliminary electronic content the appropriate sets of content usage parameters to define the final personalized content. The personalized content is then utilized to populate a homepage template, which is served to the user computer and displayed in a web browser as the homepage. The personalized content may comprise targeted advertisements or product recommendations. (End of example.)

Those having ordinary skill in the relevant art will appreciate the advantages provide by the features of the present disclosure. For example, it is a feature of the present disclosure to provide an enhanced user identification system and method for use in e-commerce. Another feature of the present disclosure is to provide an enhanced user identification system and method for personalizing electronically generated content used for webpages, emails, and other electronic documents. It is a further feature of the present disclosure, in accordance with one aspect thereof, to provide a system for personalizing electronic content to increase the probability of a sale in an e-commerce environment.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure, and the appended claims, are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for personalizing electronically generated content provided to a user computer over a network, said system comprising:
 a processor;
 a memory coupled to the processor;
 computer-readable instructions stored in the memory, that when executed by the processor, cause the processor to perform the operations of
 (i) associating a plurality of user online identifiers under a master ID by matching at least one of a user's name, physical address, and email address with a first online identifier to at least one of a user's name, physical address, and email address associated with a second user online identifier, and placing the master ID and associated plurality of user online identifiers in a database that comprises user online identifiers organized under master IDs,
 (ii) tracking, storing, and maintaining user data under the master ID, wherein the user data comprises user interaction information that has a connection to at least one of the user online identifiers matched to said master ID,
 (iii) defining or associating content usage parameters with each of the plurality of user online identifiers,
 (iv) providing, identifying, or selecting a target user online identifier for a user,
 (v) running an automated procedure for comparing the target user online identifier obtained in operation (iv) to the plurality of user online identifiers, based on the user data for each master ID in the database and, when a match is found, identifying, selecting, and storing the master ID corresponding to the match found, (vi) generating preliminary electronic content using the user online behavior for one or more of the user online identifiers associated with the stored master ID, (vii) generating personalized content by applying a set of content usage parameters corresponding to the target user online identifiers, and (viii) providing the personalized content generated in the operation (vii) to a user's electronic device.

2. The system of claim 1, wherein the plurality of user online identifiers comprises at least one of a user account, an email address, a unique tracking identifier, and an IP address.

3. The system of claim 1, wherein the plurality of user online identifiers comprises at least two of a user account, an email address, a unique tracking identifier, and an IP address.

4. The system of claim 1, wherein the plurality of user online identifiers comprises at least three of a user account, an email address, a unique tracking identifier, and an IP address.

5. The system of claim 1, wherein the plurality of user online identifiers comprises a user account, an email address, a unique tracking identifier, and an IP address.

6. The system of claim 1, wherein the target user online identifier comprises at least one of at least two user accounts, at least two email addresses, at least two unique tracking identifiers, and at least two IP addresses.

7. The system of claim 1, wherein the content usage parameters for each of the plurality of user online identifiers designates a lowest preferred taxonomy level of a product taxonomy tree.

8. The system of claim 1, wherein the content usage parameters for each of the plurality of user online identifiers define one or more product or product category filters.

9. The system of claim 1, wherein the content usage parameters for each of the plurality of user online identifiers define a recommended messaging type.

10. A method of personalizing electronically generated content for display on a user computer, said method comprising:

(A) processing by a processor a plurality of user online identifiers under a master ID by matching at least one an attribute associated with a first user online identifier to at least one attribute associated with a second user online identifier and placing the master IDs and associated plurality of user online identifiers in a database that comprises user online identifiers organized under master IDs;

(B) tracking, storing, and maintaining user data under the master ID, wherein the user data comprise user interaction information that has a connection to at least one of the user online identifiers matched to said master ID;

(c) processing by the processor content usage parameters to associate them with the plurality of user online identifiers based on a user ID confidence level for each of the plurality of user online identifiers;

(D) processing by the processor a target user online identifier for a user;

(E) running an automated procedure by executing computer-readable instructions stored in a memory coupled to the processor for comparing the target user online identifier obtained in step (D) to the plurality of user online identifiers, based on the user data for each master ID<in the database and, when a match is found, identifying, selecting, and storing the master ID corresponding to the match found;

(F) generating preliminary electronic content using the user online behavior for one or more of the user online identifiers associated with the stored master ID, wherein the preliminary electronic content identifies one or more entries in a product taxonomy tree that are predicted to be of interest to a user;

(G) generating personalized content by applying a set of content usage parameters corresponding to the target user online identifier; and (H) providing the personalized content generated in the operation (F) to a user's electronic device.

11. The method of claim 10, wherein the plurality of user online identifiers comprises at least one of a user account, an email address, a unique tracking identifier, and an IP address.

12. The method of claim 10, wherein the plurality of user online identifiers comprises at least two of a user account, an email address, a unique tracking identifier, and an IP address.

13. The method of claim 10, wherein the plurality of user online identifiers comprises at least three of a user account, an email address, a unique tracking identifier, and an IP address.

14. The method of claim 10, wherein the plurality of user online identifiers comprises a user account, an email address, a unique tracking identifier, and an IP address.

15. The method of claim 10, wherein the target user online identifier comprises at least one of at least two user accounts, at least two email addresses, at least two unique tracking identifiers, and at least two IP addresses.

16. The method of claim 10, wherein the content usage parameters for each of the plurality of user online identifiers designates a lowest preferred taxonomy level of a product taxonomy tree.

17. The method of claim 10, wherein the content usage parameters for each of the plurality of user online identifiers define one or more product or product category filters.

18. The method of claim 10, wherein the content usage parameters for each of the plurality of user online identifiers define a recommended messaging type.

* * * * *